（12) United States Patent
Da Silva Pratas Gabriel et al.

(10) Patent No.: US 11,451,838 B2
(45) Date of Patent: Sep. 20, 2022

(54) METHOD FOR ADAPTIVE STREAMING OF MEDIA

(71) Applicants: KONINKLIJKE KPN N.V., Rotterdam (NL); NEDERLANDSE ORGANISATIE VOOR TOEGEPAST-NATUURWETENSCHAPPELIJK ONDERZOEK TNO, s-Gravenhage (NL)

(72) Inventors: Alexandre Da Silva Pratas Gabriel, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNG, 'S-Gravenhage (NL)

( * ) Notice: Subject to any disclaimer, the term of this patent is extended or adjusted under 35 U.S.C. 154(b) by 101 days.

(21) Appl. No.: 16/769,726

(22) PCT Filed: Dec. 7, 2018

(86) PCT No.: PCT/EP2018/083926
§ 371 (c)(1),
(2) Date: Jun. 4, 2020

(87) PCT Pub. No.: WO2019/110779
PCT Pub. Date: Jun. 13, 2019

(65) Prior Publication Data
US 2021/0385514 A1 Dec. 9, 2021

(30) Foreign Application Priority Data
Dec. 7, 2017 (EP) .................................. 17205979

(51) Int. Cl.
H04N 21/2343 (2011.01)
H04N 21/2662 (2011.01)
H04L 65/65 (2022.01)
(52) U.S. Cl.
CPC ..... *H04N 21/234345* (2013.01); *H04L 65/65* (2022.05); *H04N 21/23439* (2013.01); *H04N 21/2662* (2013.01)
(58) Field of Classification Search
None
See application file for complete search history.

(56) References Cited

U.S. PATENT DOCUMENTS 11,076,162 B2 * 7/2021 Taibi ............... H04N 21/816
2011/0125919 A1 5/2011 Kwon et al.
(Continued)

FOREIGN PATENT DOCUMENTS

WO 2017202899 A1 11/2017

OTHER PUBLICATIONS

International Standard, Information technology—Dynamic adaptive streaming over HTTP (DASH)—Part 1: Media presentation description and segment formats, ISO/IEC 23009-1, Third Edition Aug. 2019.
(Continued)

*Primary Examiner* — Alexander Q Huerta
(74) *Attorney, Agent, or Firm* — McDonnell Boehnen Hulbert & Berghoff LLP

(57) ABSTRACT

A method for adaptive streaming of video is described, wherein the method comprises: transmitting first metadata to a client apparatus, the first metadata defining a first adaptation set, an adaptation set defining one or more sets of segment identifiers, each set of segment identifiers defining a plurality of linearly playable media segments of a predetermined resolution, each media segment in a set of media
(Continued)

segments having an identical playback duration, the first metadata enabling a client apparatus to request media segments and sequentially playout the media segments; receiving navigation information from the client apparatus, the navigation information defining at least a first region, in the video frames of the first adaptation set; selecting second metadata defining a second adaptation set on the basis of spatial playback information and a spatial distance or a spatial overlap between the first region and a second region in video frames of the first adaptation set, wherein the spatial playback information signals the server apparatus that the second region is linked to media segments of the second adaptation set; and, transmitting the second metadata or information for retrieving the second metadata to the client apparatus, the second metadata enabling the client apparatus to playback media segments of the second adaptation set after the playback of media segments of the first adaptation set.

16 Claims, 15 Drawing Sheets

(56) References Cited

U.S. PATENT DOCUMENTS

| | | | |
|---|---|---|---|
| 2015/0016543 A1 | 1/2015 | Rapaka et al. | |
| 2015/0026358 A1 | 1/2015 | Zhang et al. | |
| 2015/0120819 A1* | 4/2015 | Zhang | H04L 67/02 709/231 |
| 2016/0165309 A1* | 6/2016 | Van Brandenburg | H04N 21/64322 725/116 |
| 2017/0053675 A1 | 2/2017 | Dickerson et al. | |
| 2017/0118540 A1* | 4/2017 | Thomas | H04N 21/440263 |
| 2017/0155912 A1 | 6/2017 | Thomas et al. | |
| 2017/0332117 A1* | 11/2017 | Haritaoglu | H04N 21/47202 |
| 2017/0347026 A1 | 11/2017 | Hannuksela | |
| 2018/0077210 A1 | 3/2018 | Hannuksela et al. | |
| 2018/0103199 A1* | 4/2018 | Hendry | H04N 19/61 |
| 2018/0160160 A1* | 6/2018 | Swaminathan | H04N 21/816 |
| 2019/0014350 A1* | 1/2019 | Wang | H04N 21/85406 |
| 2019/0141311 A1 | 5/2019 | Lee et al. | |
| 2019/0174150 A1* | 6/2019 | D'Acunto | H04N 21/26258 |
| 2019/0373245 A1* | 12/2019 | Lee | H04N 21/8456 |
| 2020/0120326 A1* | 4/2020 | Deshpande | H04N 21/816 |

OTHER PUBLICATIONS

D'Acunto et al., MPD signalling of 360 content properties for VR applications, ISO/IEC JTC1/SC29/WG11 MPEG2016/m38605, May 2016.

Begen et al., Metrics and SAND Messages for DASH-VR, ISO/IEC JTC1/SC29/WG11 MPEG 118/m40333, Apr. 2017.

International Standard, Information technology—Dynamic adaptive streaming over HTTP (DASH)—Part 5: Server and network assisted DASH (SAND), ISO/IEC 23009-5, First edition Feb. 2017.

Information technology—MPEG systems technologies—Part 10: Carriage of Timed Metadata Metrics of Media in ISO Base Media File Format.

International Standard, Information technology—Coded representation of immersive media—Part 2: Omnidirectional media format ISO/IEC 23090-2, First edition Jan. 2019.

European Office Action, European Patent Application No. 18830393. 7, dated Jul. 6, 2021.

The International Search Report with Written Opinion for PCT/EP2018/083926 dated Jan. 29, 2022, 16 pages.

European Search Report for European Application No. 17205979.2 dated Mar. 29, 2018, 12 pages.

Krishnamoorthi, Vengatanathan, Patrik Bergström, Niklas Carlsson, Derek Eager, Anirban Mahanti, and Nahid Shahmehri. "Empowering the creative user: personalized HTTP-based adaptive streaming of multi-path nonlinear video." In Proceedings of the 2013 ACM SIGCOMM workshop on Future human-centric multimedia networking, pp. 53-58. 2013.

European Search Report, European Patent Application No. 17194555. 3, dated Dec. 8, 2017, 8 pages.

\* cited by examiner

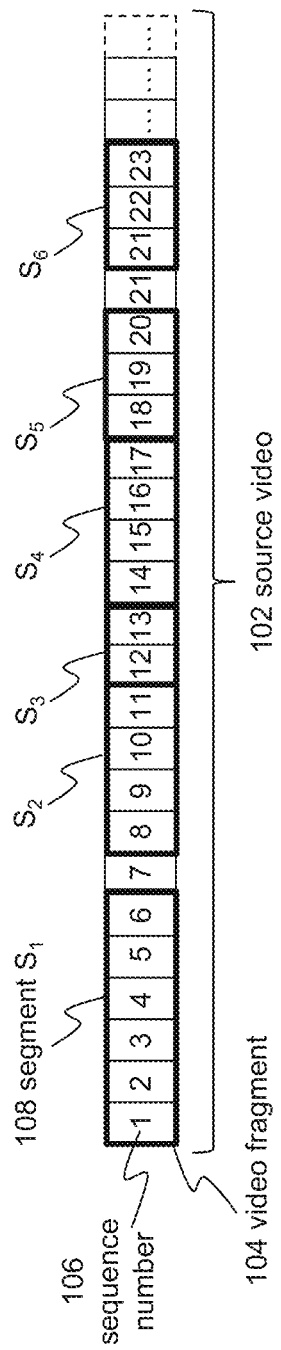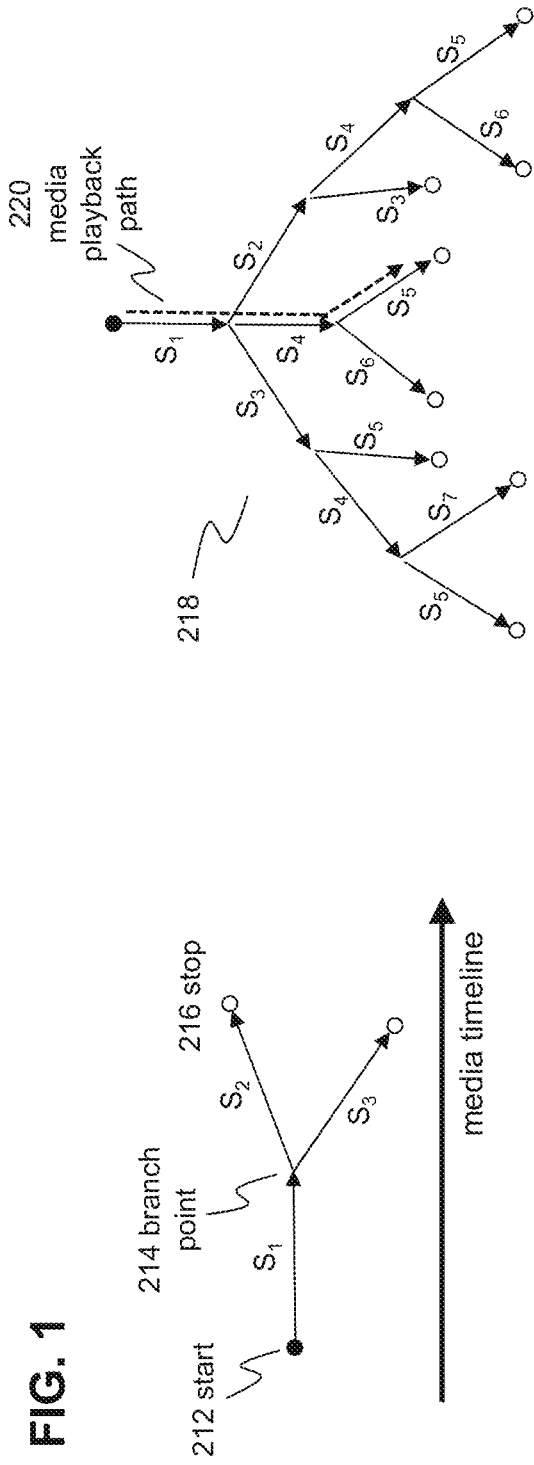
FIG. 1
FIG. 2A
FIG. 2B

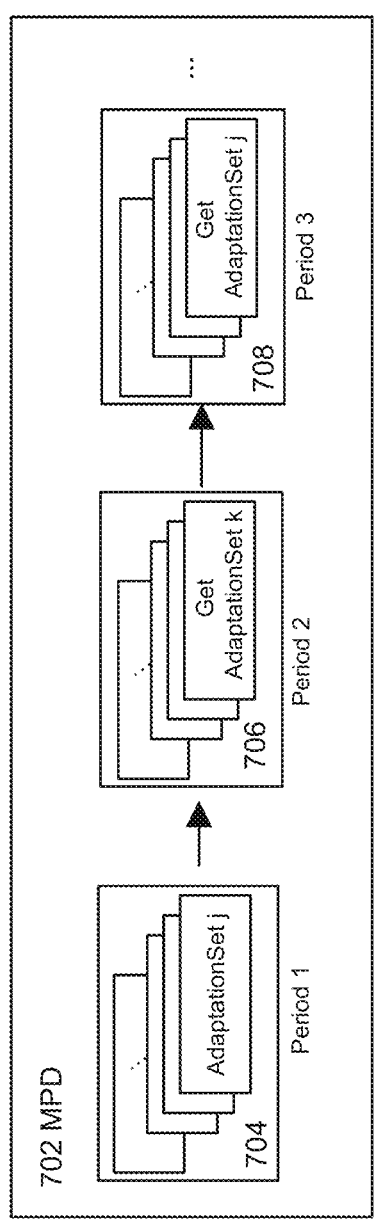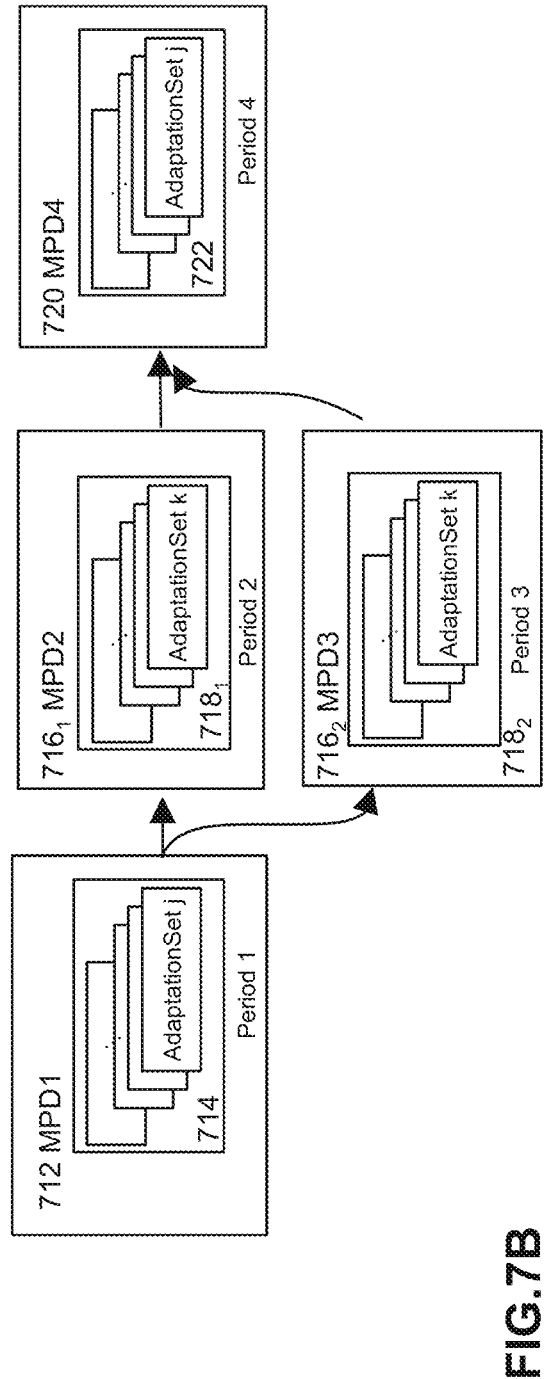
FIG.7A
FIG.7B

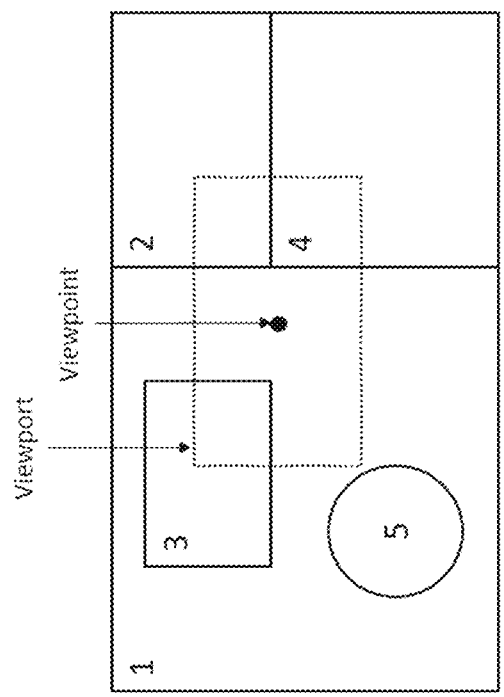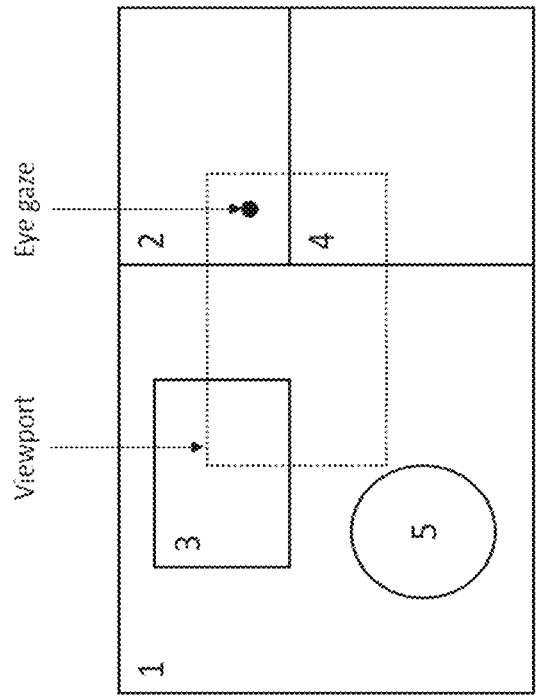
FIG. 15A
FIG. 15B

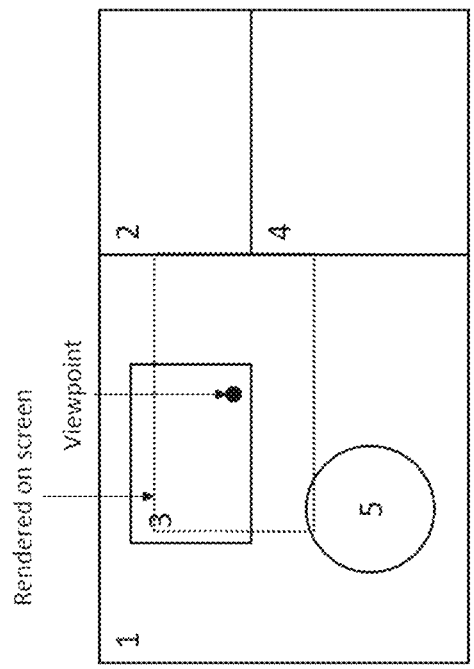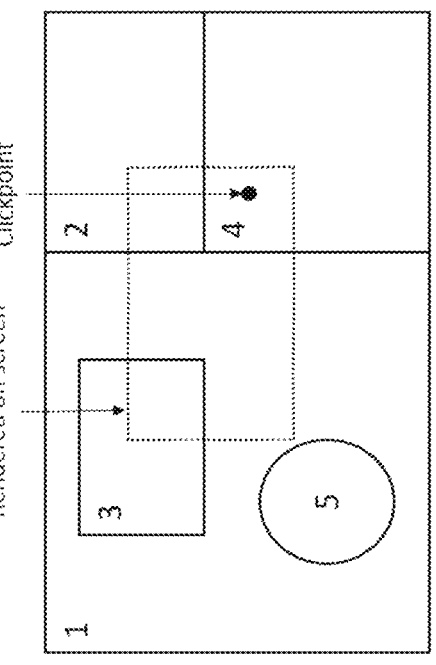
FIG. 15C
FIG. 15D

METHOD FOR ADAPTIVE STREAMING OF MEDIA

CROSS REFERENCE TO RELATED APPLICATIONS

The present application is a national stage entry of, and claims priority to, PCT/EP2018/083926, filed on Dec. 7, 2018, which claims priority to European Patent Application EP 17205979.2, filed in the European Patent Office on Dec. 7, 2017, both of which are hereby incorporated in their entirety herein by reference.

FIELD OF THE INVENTION

The invention relates to adaptive streaming of media, and, in particular, though not exclusively, to methods and systems for adaptive streaming, preferably server-based streaming, of media, a client apparatus and server apparatus for adaptive streaming of, preferably nonlinear, media, data structures enabling server-based adaptive streaming of nonlinear video and a computer program product using such methods.

BACKGROUND OF THE INVENTION

Advances in both camera and image processing technologies not only enable recording in ever higher resolutions, but also stitching the output of multiple cameras together. This way a set of cameras can together record in panorama and/or omnidirectional format at resolutions higher than 8K×4K. Video representations including video projected on a curved surface, such as omnidirectional video or 360-degree video (which may be referred to as spherical video) or more specific video representations such as cylindrical video. These new video representations enable new user experiences such as virtual reality (VR), augmented reality (AR) and mixed reality, which are currently gaining momentum in the industry. Streaming high-quality non-planar video content however still poses challenges including the high-bandwidth requirements that are needed and formats that are suitable for representing spherical content in a bitstream.

With the rising popularity of these new video representations, new applications are developed for further increasing the immersiveness of the user experience. One of these new applications is so-called interactive 360 video applications, which sometimes is referred to as playback of nonlinear video. US2017/0053675 describes a content creation system that is adapted to create an interactive 360-degree video file, which contains a plurality of linked 360-degree video clips. A content creator system enables insertion of a link in a first 360 video clip to a second 360 video clip. The link may have the form of a so-called "hotspot", typically indicator in the form of a graphical overlay over the video, which can be activated by a user. This way, the content may be played back by activating hotspots using a cursor which follows the viewing direction, i.e. the viewpoint, of the user wearing a HMD. The content creator system thus links 360 video clips using hotspots and creates one interactive 360 video file by transcoding the linked clips a single interactive 360 video file. This way, the 360 video content can be played back via different playback paths.

A problem related to the referenced content creator system is that it does not generate content that can be distributed in a scalable manner and that is compatible with state-of-the-art streaming protocols (including e.g. HTTP adaptive streaming protocols like MPEG DASH and HLS) and content distribution systems such as content distribution networks (CDNs). Such features are indispensable for large-scale content delivery. A CDN is optimized for efficient content streaming wherein different parts of the content file (e.g. popular and non-popular content, advertisement content, frequently used tile streams, etc.) are stored and/or cached in a distributed way, i.e. at different locations in the network. A further problem relating to the content creator system is that the technology is not very flexible in terms of authoring. Once the video file is created, the links and the content (the video clips) are fixed. The technology does not allow flexible authoring and dynamic introduction of new linked pieces of 360 video and/or the removal of links to existing 360 video during playback. The absence of such functionality is especially disadvantageous in the context of personalized content, e.g. targeted advertisements, which requires dynamic insertion of media during playback.

The article by Krishnamoorthi et al., "Empowering the creative user: personal HTTP-based adaptive streaming of multi-path nonlinear video", pp. 53-58, describes an adaptive streaming scheme that is capable of playback of a type of nonlinear media. The streaming process is based on Adobe's HTTP Dynamic Streaming (HDS) protocol, wherein a source video is divided in a sequence of so-called video fragments (i.e. video files of a short duration, which in other standards may be referred to as chunks or (media) segments). Each video fragment has a sequence number wherein sequence numbers of subsequent video fragments are monotonically increasing with the playback timeline. Sequence of video fragments representing the source video may be logically formatted in so-called HDS segments, i.e. sequences of video fragments wherein each video fragment may only be part of one segment.

Metadata describing the video fragments and associated HDS segments is stored a manifest file and a HDS client device uses the manifest file to retrieve and playback video fragments in HDS segments in accordance with their sequence numbers. The authors of the article extended HDS client device with a download manager that is adapted to receive a further metadata file defining different sequences of HDS segments, wherein each sequence of HDS segments defines a playback path through the sequentially ordered video fragments. The different playback paths through the sequence of HDS segments can be represented in a tree structure including branches wherein at a branch the HDS client can select between different HDS segments on the basis of certain rules.

A problem related to the above-referenced adaptive streaming scheme is that it has only limited flexibility in authoring, amending and personalizing playback paths. Due to the fact that video fragments are addressed on the basis of sequence numbers, the scheme does not allow repetitive playback of one or more HDS segments that have already played back earlier in the playback path. This provides a substantial limitation in the way video can be played back, especially when dealing with spherical video. The above-referenced adaptive streaming scheme also does not provide a scheme wherein an author can flexible insert different alternative segments in an already existing playback scheme. A further problem is that is does not provide a scheme for adaptively streaming of nonlinear spherical video.

Another problem associated with the scheme proposed by Krishnamoorthi et al is that it requires an extension of the client device so that it is capable of receiving and parsing the further metadata file and request and playback HDS segments as selected by the user. This scheme does not allow legacy clients to stream and playback nonlinear video.

Hence, from the above it follows that there is a need in the art for improved methods and systems for adaptive streaming of nonlinear media. In particular, there is a need in the art for methods and systems for adaptive streaming of nonlinear media are compatible with state-of-the art content delivery networks. Moreover, there is a need in the art for methods and systems for adaptive streaming of nonlinear media that allow flexible generation of nonlinear media, e.g. video and audio data, wherein, during streaming, a client device, including a legacy HAS client device, may select from different media paths wherein each media path may be associated with a different media experience.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. It is an aim of the invention described in this disclosure is to allow a content creator to create different media experiences based on the way a user interacts with the video, e.g. the viewing behaviour of the user and/or panning or zooming actions of the user. Media that during playback provides different media experiences depending on the way a user interacts with the media may be referred to as nonlinear media, wherein media may include video and/or audio data.

In an aspect, the invention may relate to a method for adaptive streaming of video, preferably http-based adaptive video streaming. In an embodiment, the method may include a server apparatus transmitting first metadata to a client apparatus, the first metadata defining a first adaptation set, an adaptation set defining one or more sets of segment identifiers, each set of segment identifiers defining a plurality of linearly playable video segments of a predetermined resolution, each video segment in a set of video segments preferably having an identical playback duration, the first metadata enabling a client apparatus to request video segments and sequentially playout the video segments; the server apparatus receiving navigation information from the client apparatus, the navigation information defining at least a first region, preferably a region of interest (ROI) of a user of the client apparatus, in video frames of the first adaptation set; the server apparatus selecting second metadata defining a second adaptation set on the basis of spatial playback information and a spatial distance or a spatial overlap between the first region and a second region in the video frames of the first adaptation set, wherein the spatial playback information signals the server apparatus that the second region in the video frames of the first adaptation set is linked to video segments of the second adaptation set; and, the server apparatus transmitting the second metadata or information for retrieving the second metadata to the client apparatus, the second metadata enabling the client apparatus to playback video segments of the second adaptation set after the playback of video segments of the first adaptation set.

Hence, the invention relates to a method for adaptive streaming of media (e.g. video, audio and/or type of streamable data, e.g. point could data, etc.) wherein a server apparatus, e.g. a metadata server, receives navigation information from a client apparatus that is playing back video on the basis of first metadata defining a first adaptation set and uses the navigation information and spatial playback information to select second metadata defining a second (further) adaptation set for the client apparatus. The spatial playback information may include spatial playback region descriptors linking a region in a scene represented by the video frames of a first adaptation set, e.g. a region in video frames of segments belonging to the first adaptation set, to a further adaptation set. The spatial playback information thus signals the server apparatus how adaptation sets of different playback periods are spatially linked to each other.

If during playback of a first adaptation set a user of a client apparatus is looking in a particular viewing direction (a viewpoint) or if the user of a client apparatus is looking to a certain region (a viewport) in a video scene, the server may use such navigation information to select a further adaptation set for playback. The metadata associated with the further adaptation set may be transmitted by the server to the client apparatus.

The selection may be based on a spatial distance or a spatial overlap between the regions. Here, a spatial distance may refer to a distance between different regions in video frames or vide picture of video segments. The spatial distance may be defined on the basis of some rules, e.g. the distance, e.g. in pixel units or another suitable unit, between the centers of each of the regions. Similarly, a spatial overlap refers to an overlap between different regions in video frames or video pictures of video segments.

The metadata defining the adaptation sets and the spatial playback information linking one or more regions in video of different adaptation set to further adaptation sets may be stored in a storage, e.g. a database, connected to the server apparatus. The metadata defining the adaptation sets and the spatial playback information may define so-called nonlinear media, i.e. media defining different media playback paths wherein a playback path may be selected by the server apparatus on the basis of navigation information, e.g. information associated with the way a user interacts with the media during playback.

The invention allows adaptive steaming of media, in particular nonlinear (interactive) media wherein the media, e.g. the sets of video segments of the adaptation sets of the different playback periods, may be stored in the network in a distributed way i.e. at different network nodes (media servers and/or caches) of a CDN. Further, the authoring of the nonlinear media can be simply done by linking video of different adaptation sets on the basis of the spatial playback information. Within an adaptation set, the sequence in which segments should be played back is fixed, thereby not limiting the way an author links the adaptation sets during authoring. Hence, a media playback path that is defined on the basis of spatial playback information may include multiple playback of the same adaptation set.

In an embodiment, the second metadata may be transmitted in a second manifest file or in a manifest file update message to the client apparatus. Hence, in case of HTTP adaptive streaming metadata may be transmitted to the client apparatus in a manifest file or a manifest file update message that comprises the second metadata and instructions for the client apparatus to update the first manifest file on the basis of the second metadata.

In an embodiment, the spatial playback information may include a destination identifier associated with the first adaptation set, the destination identifier being linked to a source identifier associated with the second adaptation set.

In an embodiment, the method may comprise the server apparatus receiving one or more request messages from the client apparatus or receiving information associated with the one or more request messages, the one or more request messages signaling the server apparatus to transmit segments of the first adaptation set to the client apparatus. Hence, in this embodiment, the server apparatus may include or may be part of a media server system (e.g. a CDN or the like) which is capable of receiving requests of a client apparatus and transmitting requested media, e.g. video segments, to the client apparatus.

In an embodiment, the navigation information and, optionally, a client identifier, may be transmitted in one or more request messages to the server apparatus. In an embodiment, a request message may be an HTTP message, such as a GET message or a HTTP POST message.

In an embodiment, the navigation information may be transmitted over a separate (bi-directional) communication channel, to the server apparatus. In an embodiment, such communication channel may be implemented as a Web-Socket communication channel or a DASH Aware Network Element (DANE) communication channel. In an embodiment, the navigation information may include a client identifier. Hence, in these embodiments, the signalling between the client apparatus and the server may be based on a dedicated channel.

In an embodiment, the first metadata, which may be part of a manifest file, may define a set of adaptation sets, each adaptation set defining video segments of a tile stream, wherein video frames of a respective tile stream define a (distinct) spatial subpart (a tile) of a video picture. The set of adaptation sets may be defined that for tile streams of the same resolution, each tile stream defines a different spatial subpart, whereby the spatial subparts may overlap or may have common boundaries.

Such video picture may be formed by combining video frames of each of the tile streams of the first set of adaptation sets, provided that the video frames of respective tile streams do not spatially overlap, but instead are all bordering each other. In a further embodiment, the first metadata may comprise spatial relation information, preferably one or more spatial relationship descriptor (SRD) elements, defining the location and/or the dimensions of the spatial subparts. In an embodiment, the server apparatus may determine the navigation information on the basis of the tile streams requested by the client apparatus, preferably on the basis of the spatial relation information associated with the tile streams. Hence, in these embodiments, the server apparatus may derive the navigation information from the tile streams that are requested by the client apparatus. This way, navigation information is sent to the server apparatus via the tile stream requests.

In an embodiment, the segment identifiers in the first metadata may be associated with a client identifier or information for determining a client identifier. The client identifiers enable the server apparatus to distinguish between requests of different client apparatus.

In an embodiment, the spatial playback information may include location information of the first region and, optionally, information associated with the dimensions and/or shape of the first region. In an embodiment, the location information including coordinates of the first region in one or more video frames of the first adaptation set or information to determine coordinates of the first region in one or more video frames of the first adaptation set.

In an embodiment, the spatial playback information may include a dynamic region parameter, the dynamic region parameter signaling the server apparatus that the location of the first region changes as a function of time, preferably the coordinates associated with the location of the first region being stored as metadata of the video data of the first playback period.

In an embodiment, the spatial playback information may define a plurality of regions in video frames of the at least one first adaptation set and a plurality of destination identifiers associated with the plurality of regions, each destination identifier signaling the server apparatus that a region associated with a destination identifier is linked to a further adaptation set, the server apparatus selecting the second adaptation set from the plurality of further adaptation sets on the basis of the locations of the regions and the location of the at least a second region.

In an embodiment, the adaptive streaming may be based on an HTTP adaptive streaming protocol, preferably the protocol being one of: MPEG Dynamic Adaptive Streaming over HTTP (MPEG DASH), 3GPP DASH or MPEG Common Media Application Format (CMAF); and/or, wherein a playback period is defined as a Period as defined in the MPEG DASH standard or a CMAF Presentation as defined in the CMAF standard, preferably a Period comprising one or more Adaptation Sets, an Adaptation Set including one or more Representations, a Representation including segments comprising video data of a predetermined video quality and CMAF Presentation comprising one or more CMAF Switching Sets, a CMAF Switching Set including one or more CMAF Tracks, a Track including CMAF fragments comprising video data of a predetermined video quality.

In an embodiment, video data of a video segment may include spherical video data, the spherical video data defining pixels on a curved surface, the region of interest including a viewing direction of a user viewing the video playback of the spherical video data, the region of interest and the first region being defined on the basis of a spherical coordinate system.

In an aspect, the invention may relate to a client apparatus comprising: a computer readable storage medium having computer readable program code embodied therewith, and a processor, preferably a microprocessor, coupled to the computer readable storage medium, wherein responsive to executing the first computer readable program code, the processor is configured to perform executable operations comprising: receiving metadata, preferably a first manifest file comprising the metadata, from a server apparatus, the metadata defining a first adaptation set, an adaptation set defining one or more sets of segment identifiers, each set of segment identifiers defining a plurality of linearly playable video segments of a predetermined resolution, each video segment in a set of video segments preferably having an identical playback duration, the first metadata enabling the client apparatus to request video segments and sequentially playout the video segments; selecting one or more segment identifiers on the basis of the metadata and transmitting one or more requests comprising the one or more segment identifiers and the client identifier associated to a server apparatus; transmitting navigation information to the server apparatus, the navigation information defining at least a region, preferably a region of interest (ROI) of a user of the client apparatus, in the video frames of the first adaptation set; and, receiving second metadata or information for retrieving the second metadata, the second metadata enabling the client apparatus to playback video segments of the second adaptation set after the playback of the first adaptation set In an embodiment, receiving second metadata may include receiving a second manifest file receiving a manifest file update message.

In an embodiment, the first manifest file may comprise at least one manifest file element, preferably an xlink manifest file element, the manifest file element signalling the client apparatus to request metadata defining a second adaptation set associated.

In a further aspect, the invention may relate to a server apparatus configured to generate metadata for a client apparats, the metadata being configured to enable streaming of, preferably nonlinear, media to the client apparatus, the server apparatus comprising: a computer readable storage medium having computer readable program code embodied therewith, and a processor, preferably a microprocessor, coupled to the computer readable storage medium, wherein responsive to executing the first computer readable program code, the processor is configured to perform executable operations comprising: transmitting first metadata to a client apparatus, the first metadata defining a first adaptation set, an adaptation set defining one or more sets of segment identifiers, each set of segment identifiers defining a plurality of linearly playable video segments of a predetermined resolution, each video segment in a set of video segments having an identical playback duration, the first metadata enabling a client apparatus to request video segments and sequentially playout the video segments; receiving navigation information from the client apparatus, the navigation information defining at least a first region, preferably a region of interest (ROI) of a user of the client apparatus, in the video frames of the first adaptation set; selecting second metadata defining a second adaptation set on the basis of spatial playback information and a spatial distance or a spatial overlap between the first region and a second region in video frames of the first adaptation set, wherein the spatial playback information signals the server apparatus that the second region is linked to video segments of the second adaptation set; and, transmitting the second metadata or information for retrieving the second metadata to the client apparatus, the second metadata enabling the client apparatus to playback video segments of the second adaptation set after the playback of video segments of the first adaptation set, preferably the second metadata being transmitted in a second manifest file or in a manifest file update message to the client apparatus.

The invention may also relate to a program product comprising software code portions configured for, when run in the memory of a computer, executing any of the method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 depicts a data model of a known adaptive streaming scheme for nonlinear media;

FIGS. 2A and 2B depicts a graph illustrating different playback paths in a known adaptive streaming scheme for nonlinear media;

FIGS. 7A and 7B schematically depicts the processing of metadata which a client apparatus receives from a server apparatus according to an embodiment of the invention;

FIG. 15A-15E illustrate the selection of an adaptation set using a spatial playback region according to various embodiments of the invention.

DETAILED DESCRIPTION

Figure 3:
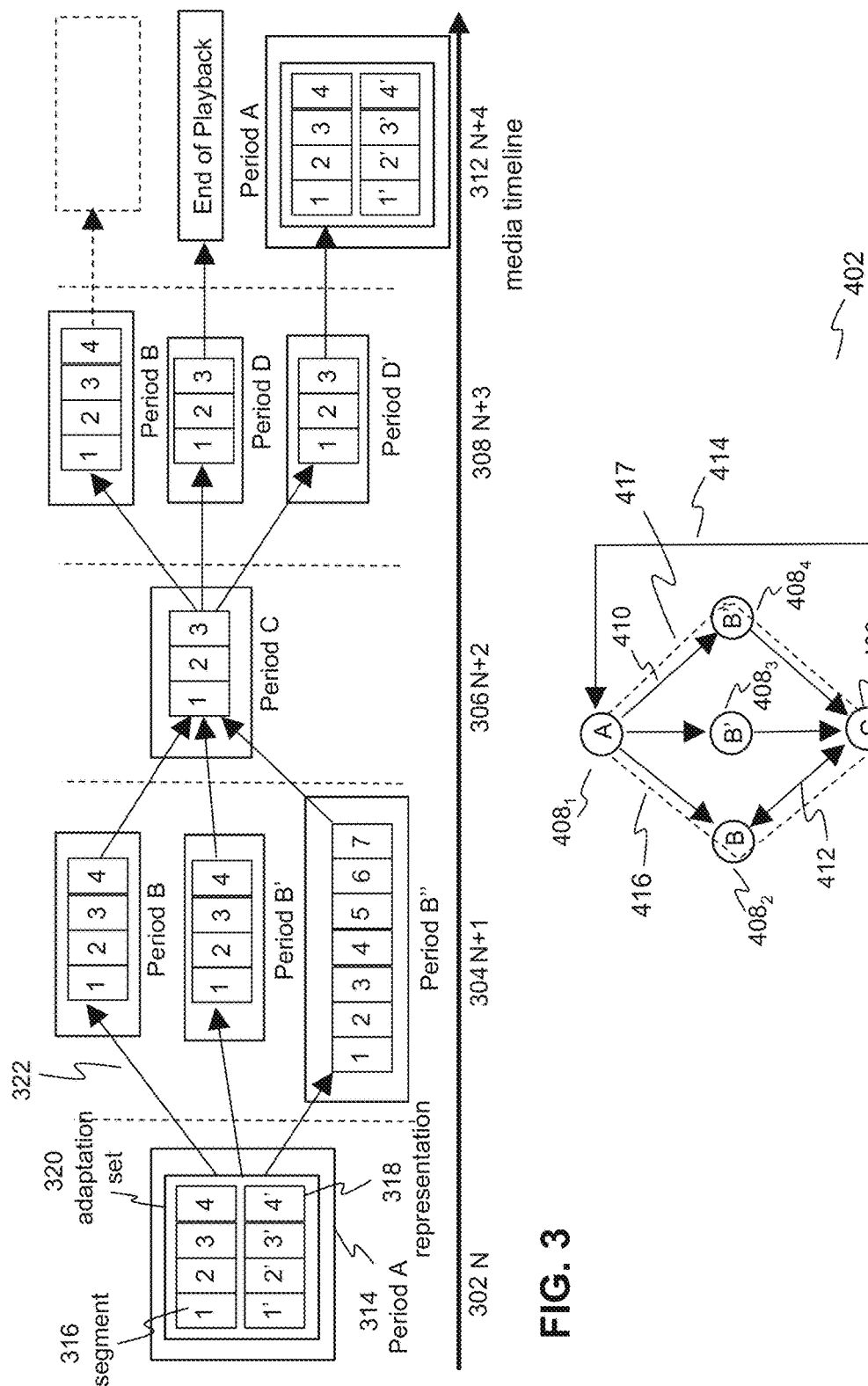
FIG. 3 depicts a schematic of an adaptive streaming process for nonlinear media according to an embodiment of the invention.

It is an aim of the embodiments in this disclosure to provide a HTTP adaptive streaming (HAS) and authoring scheme for nonlinear media. The embodiments in this disclosure allow streaming of temporally and, optionally, spatially segmented nonlinear media, including advanced video formats, such as ultra-high definition panorama video, spherical video (e.g. omnidirectional or 360 video) or other types of video formats (e.g. cylindrical video or the like). While the exemplary implementations of the invention are described on the basis of an HTTP adaptive streaming (HAS) protocol referred to as MPEG DASH, implementations in other types of streaming protocols for delivery of segmented media such as 3GPP DASH and other types of segments formats such as MPEG Common Media Application Format (CMAF), are also foreseen.

Adaptive streaming schemes for delivery of temporally segmented nonlinear media are known in the prior art. For example, Krishnamoorthi et al. described in their article "Empowering the creative user: personal HTTP-based adaptive streaming of multi-path nonlinear video", pp. 53-58, an adaptive streaming scheme that is capable of playback of a type of nonlinear media. Part of this known scheme is schematically depicted in FIGS. 1 and 2. The streaming process is based on Adobe's HTTP Dynamic Streaming (HDS) protocol, which used as data model that is shown in FIG. 1. A linear source video 102 is temporally divided in a sequence of so-called video fragments 104 (i.e. video files of a short duration, which in other standards may be referred to as chunks or (media) segments). Each video fragment may be stored in different qualities so that during streaming a client device can decide on the basis of the available bandwidth to switch from one video quality to another video quality. This way, the client device is able to adapt to changing network conditions by adapting its streaming behaviour.

Each video fragment has a sequence number 106 wherein sequence numbers of subsequent video fragments are monotonically increasing with the playback timeline. Sequence of video fragments representing the source video may be logically formatted in so-called HDS segments 108. A HDS segments defines a set of video fragments wherein the video frames are arranged according to their sequence numbers. Each video fragment may only be part of one segment.

Metadata describing the video fragments and associated HDS segments is stored in a manifest file and a HDS client device uses the manifest file to retrieve and playback video fragments in HDS segments in accordance with their sequence numbers. The retrieval of the video fragments includes the HDS client device sending HTTP requests to a server for requesting transmission of video fragments of different sequence numbers to the client device.

The authors of the article extended a HDS client device with a download manager that is adapted to receive a further metadata file defining different sequences of HDS segments, wherein each sequence of HDS segments defines a playback path through the sequentially ordered video fragments. This is schematically depicted in FIGS. 2A and 2B. As shown in FIG. 2A, the metadata file may define that video playback may be started on the basis of video fragments of HDS segment S1. After playback of HDS segment S1, the metadata in the metadata file may define that the end of HDS segment S1 is associated with a branch point 214 wherein—depending on some rules—either video fragments of HDS segment S2 or video fragments of HDS segment S3 may be played back. The branch point thus defines two different playback paths. This way, the metadata file may define multiple sequences of HDS segments defining multiple playback paths. The structure of the different playback paths 220 can be represented in a tree structure 218 including branches wherein at a branch the HDS client can select between different HDS segments on the basis of certain rules.

A problem related to the above-referenced adaptive streaming scheme is that it has only limited flexibility in authoring, amending and personalizing playback paths. As shown in FIG. 2B, each playback path 220 is formed by a sequence of segments wherein the video fragments are ordered on the basis ascending sequence number. Because video fragments are addressed based on sequence numbers, the scheme only allows selection and playback of segments that include video fragments that have a sequence number that is higher than the sequence numbers of the video fragments that have already been played back. In other words, the scheme does not allow repetitive playback of one or more HDS segments that have already played back earlier in the playback path.

This provides a substantial limitation in the way video can be played back, especially when dealing with spherical video. The above-referenced adaptive streaming scheme also does not provide a scheme wherein an author can flexible insert different alternative segments in an already existing playback scheme.

FIG. 3 depicts a schematic of an adaptive streaming process according to an embodiment of the invention. In particular, FIG. 3 depicts an adaptive streaming process which may use a data format that is compatible with the MPEG DASH or the CMAF standard and extensions thereof. In this scheme, media data (i.e. audio and/or video data) are defined as a plurality of playback periods 302-312, wherein each playback period may define one or more pieces of content of a predetermined length and a predetermined starting time. As shown in FIG. 3, a playback period, e.g. playback period A 314, may contain media data in the form of set of temporally ordered, short linearly playable media files which in MPEG DASH are referred to as media segments 316. A sequence of segments comprising media of a predetermined quality may also be referred to as a representation 318. A playback period may be stored as a plurality of representations, wherein each representation represents media data, e.g. a set of video segments, of a predetermined resolution or quality version. The plurality of representations may be referred to as an adaptation set 320.

During playback of media data of a playback period, a client device may sequentially request the network to transmit segments of a predetermined representation. If the available bandwidth requires so, the client device may decide at one point to continue playback on the basis of segments of another representation (e.g. a lower video quality). The information about the structure of the media, including the playback periods, adaptation sets, representations and segments, may be stored in a so-called manifest file, which in MPEG DASH is referred to as a Media Presentation Description (MPD).

The manifest file may be provided to the client device, which may store it in its memory. During playback, the HAS client device may parse the manifest file and look for a first playback period that is defined as the start of the media playback. During playback of the media segments of an adaptation set of a current playback period, the HAS client will look for the next playback period that needs to be played back after the end of the playback of the current playback period.

In the present invention, the playback order of the adaptation sets of the different playback periods is defined by so-called spatial playback information, which includes information that links a region of interest (ROI) in the video frames or video pictures of a first adaptation set of a first playback period to a second adaptation set of a second playback period. Such region of interest (ROI) may be referred as a spatial playback region or—in short—a region.

As shown in FIG. 3, during playback, the HAS client may use the manifest file to request segments of an adaption set to a server and put these selected segments sequentially on the media playback timeline. For example, the HAS client may select an adaption set of playback period A 302 as a first Period N on the media timeline for playback. During playback, the HAS client may request metadata associated with a further second adaptation set to the server. The server may determine on the basis of spatial playback information 322 associated with the first adaptation set that three adaptation sets of three different Playback Periods B, B', B" 304 are available for playback as the next Period N+1 on the media timeline. In particular, on the basis of the spatial playback information the server may determine that each of three regions in a scene of video data of an adaptation set of playback period A are linked to an adaptation set of one of the three different Playback Periods B, B', B". The server may use navigation information, e.g. user interaction information, transmitted by the client device to the server, in order to select one of these adaption sets and to transmit metadata associated with the selected adaption set to the client apparatus, so that the client apparatus may request the video segments and playback the video segments once the media playback of the adaptation set of Period A is finished.

One or more regions defined in a scene represented by video data of the first adaptation set and the linkage of each of these regions to a further adaptation set (e.g. the adaptation sets associated with playback periods B, B' and B" as depicted in FIG. 3) enable a the server apparatus to select an adaptation set on the basis of navigation information.

The information defining the regions in the scenes and linking the regions to further adaptation sets may be referred to as spatial playback information. The spatial playback information may define one or more spatial playback region descriptors associated with an adaptation set defining one or more regions in video frames or video pictures of the video segments of the adaptation set and linking each region to a further adaptation set that is associated with a spatial playback region. Such spatial playback region descriptor may be hereafter be referred to as a region descriptor. The region descriptor and its use in playback of nonlinear media in a HAS streaming scheme will be described hereunder in greater detail.

Hence, the server apparatus may select an adaptation set of a next playback period from a plurality of playback periods that may be linked to different spatial playback regions in content of a playback period the HAS client is currently playing. The selection of the next playback period by the server apparatus on the basis of the spatial playback information and on the basis of the navigation information may be implemented in different ways.

For example, in an embodiment, the HAS client may receive information about the viewing behavior of the user. The viewing behavior may include e.g. coordinates associated with an area of a scene a user is currently watching or interacting with. When a user is watching spherical video data the area the user is watching may be referred to as a viewport. The HAS client may transmit this information as navigation information to the server apparatus which may use this information to select an adaptation set of a next playback period from the plurality of playback periods as indicated by the spatial playback information. For example, when the viewport matches or at least partly coincides with a region for a certain time, the server apparatus may select an adaptation set that is linked to the region.

Referring to FIG. 3, if, during playback of a current adaptation set, the server apparatus determines that the user is looking (for a predetermined period of time) to a certain predetermined area or in the direction of a certain region in the video of the current adaptation set that is linked to an adaptation set of Playback Period B', the server apparatus may select the adaptation set of this playback period as the next playback period and transmit metadata defining the selected adaptation set to the HAS client device, which may use the metadata to request video segments and put the video as Period N+1 304 on the media timeline. The spatial playback information may signal the server apparatus that a region in a video scene represented by video data of an adaptation set of playback period B' is linked to an adaptation set in playback period C. This way, the server apparatus may transmit metadata defining the adaptation set of playback period C. Hence, after playback of playback period B', the HAS client device may use the received metadata to put playback period C as Period N+2 306 on the media timeline. Thereafter, during playback of the video data of playback period C, the server apparatus may select from a plurality of adaptation sets which are associated with different playback periods, i.e. Playback Period B, Playback Period D or Playback Period D', and transmit metadata associated with the selected adaptation set to the client device Hence, in this situation, depending on the viewing behavior of the user, the HAS client may put Playback Period B again as Period N+3 308 on the media timeline.

The HAS media playback scheme depicted in FIG. 3 allows a HAS client device to playback video defined as a predetermined number of linked adaptation. This way, depending on the way the user interacts with the video, e.g. the viewing behavior of the user, the user may experience a different media experience.

Figure 4:
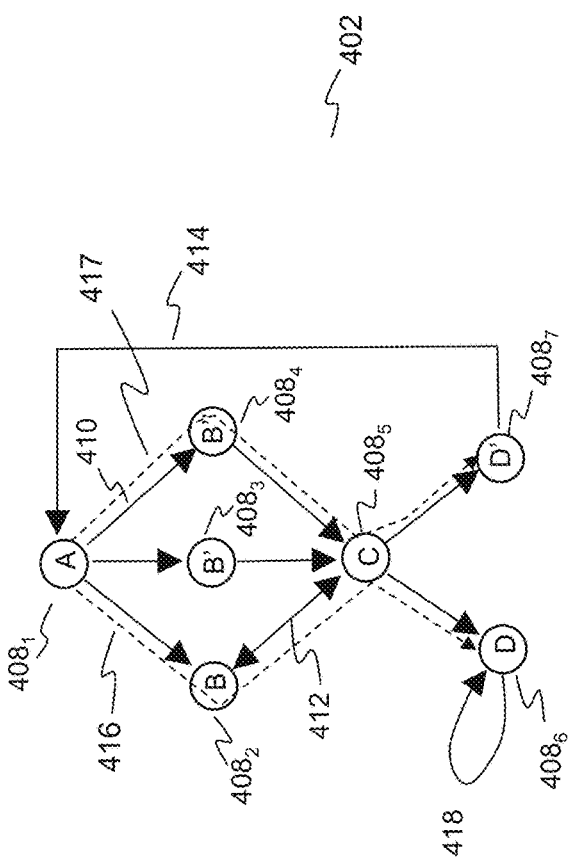
FIG. 4 depicts a graph illustrating different playback paths in an adaptive streaming scheme for nonlinear media according to an embodiment of the invention.

FIG. 4 depicts a graph illustrating different playback paths in an adaptive streaming scheme according to an embodiment of the invention. Here, adaptation sets of different playback periods may form a directed graph including vertices $408_{1-7}$ connected by directed edges 410-418, i.e. an edge associated with a direction. In this scheme, the vertices may represent adaptation sets in playback periods and the directed edges define how the adaptation sets in playback periods are linked to each other. As shown in FIG. 4, the directed edges may define different playback paths through the linked adaptation sets of playback regions. At least one vertex, e.g. vertex A $408_1$, may define the start of the playback path, and at least one vertex the end of the playback scheme. For example, a first playback path 416 may signal a server apparatus that adaptation sets of playback periods A, B, C and D may can be sequentially played back by a client apparatus in order to provide a first media experience to a user. Similarly, a second playback path 417 may signal the server apparatus that adaptation sets of playback periods A, B", C and D' may be sequentially played back in order to provide a second media experience to a user. Depending on the metadata, a media playback path may include the playback of an adaptation set multiple times, e.g. A, B, C D, D, D, . . . . As shown in FIG. 4, the invention allows construction of different types of playback paths, e.g. an edge may define a bidirectional path 412 between two vertices, an edge 414 may define a path that refers back to the start of a playback path and/or a self-loop, i.e. an edge 418 that connects a vertex with itself. Hence, in contrast to prior art adaptive streaming schemes for nonlinear playback, the invention allows authoring of nonlinear media that allows playback of (parts of) a media path multiple times. Such functionality is particular advantageous in playback schemes of spherical video, e.g. a guided tour through an area of a building in which a user is allowed determine its own path through the media by interacting with the media.

Figure 5:
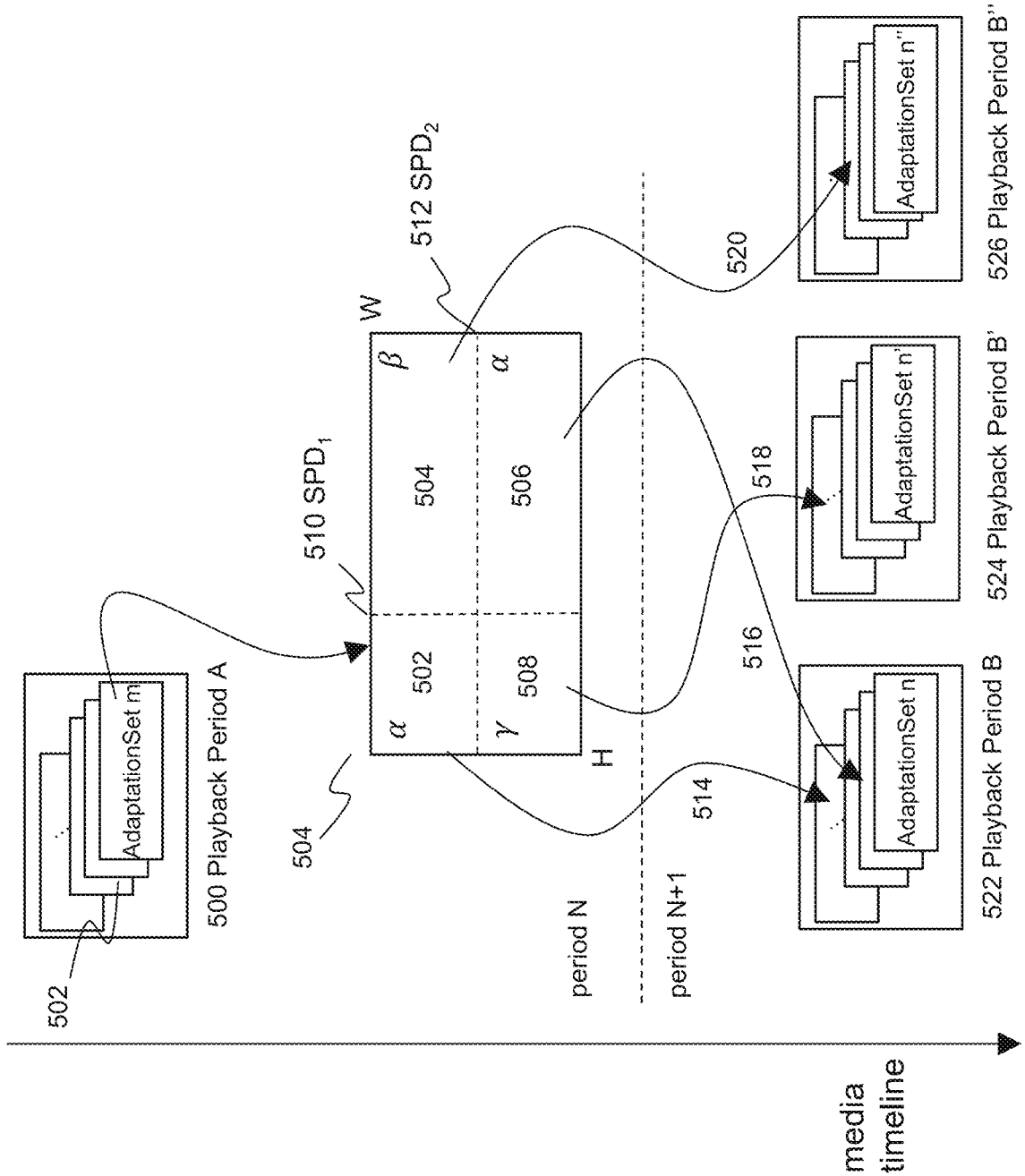
FIG. 5 depicts the use of spatial playback regions in an adaptive streaming process for nonlinear media according to an embodiment of the invention.

FIG. 5 depicts the use of spatial playback regions in an adaptive streaming process for nonlinear media according to an embodiment of the invention. In particular, FIG. 5 schematically depicts the playback of an adaptation set 502 of playback period A 500 as period N on the media timeline. During playback, the HAS client device uses the metadata in the manifest file to retrieve media segments associated with the first (current) adaptation set 502. These segments may include spherical video data which may be decoded by a video decoder into video frames 504 which will be rendered as spherical video using a suitable playback device. Spatial playback information associated with the adaptation the HAS client device is currently playing back may define spatial playback regions 502-508 which can be mapped onto the video frames of the first adaptation set. A spatial playback region (SPR) may define a region in a certain media space, e.g. a 2D media space in which content is represented in a 2D plane, e.g. in the form of pixels in a rectangular video frame, or a 3D media space in which content may be represented one a spherical plane, e.g. in the form of pixels on a sphere. A suitable coordinate system, e.g. a 2D Cartesian coordinate system or a 3D spherical coordinate system, may be used to define the location of the region in the media space. During playback of the adaptation set, the HAS client device may transmit navigation information to the server and use the navigation information and the spatial playback regions in order to select a further adaptation set for playout.

The regions may be defined using one or more spatial playback dividers 510,512. A spatial playback divider may define a line dividing a video frame in different regions. In another embodiment, the regions may be defined on the basis of coordinates. Further, metadata defining a spatial playback region may include references 514-520 to adaptation sets of playback periods which may be played out by the HAS client device after the first adaptation set. The example in FIG. 5 depicts four regions 502-508 in video frames of the first adaptation set which are linked to adaptation sets of three different playback periods B, B', B" 522-526 which signals the server apparatus that it may select one of these adaptation sets on the basis of navigation information transmitted by the client device to the server apparatus.

The spatial playback information, such as information defining the spatial playback regions and the links to the adaptation sets may include region descriptors. In an embodiment, a region descriptor may be defined as a predefined metadata element, e.g. a SpatialPlaybackRegion metadata element which is associated with an adaption set. The region descriptor may define a position and dimensions of a region in the scene represented by the video data of an adaptation set using a suitable coordinate system including a conventional Cartesian coordinate system or a spherical coordinate system using spherical coordinates. The syntax for the spherical coordinate case is described hereunder in more detail.

Table 1 hereunder describes an example of a region descriptor according to an embodiment of the invention. In particular, table 1 describes a number of parameters associated with an MPEG DASH type region descriptor SpatialPlaybackRegion. The SpatialPlaybackRegion MPD element may comprise parameters for defining an area representing a spatial playback region.

TABLE 1

Spatial Playback Region definition

| SpatialPlaybackRegion | Semantic of parameters |
|---|---|
| id | Identifier of the current SPR |
| width | Width of the area in a rectangular region |
| height | Height of the area in a rectangular region |
| top_left_x | X coordinate of the top left corner position of the current SPR |
| top_left_y | Y coordinate of the top left corner position of the current SPR |

As shown in table 1, the region descriptor may include a first region descriptor identifier ("id"), identifying the descriptor of a region in the scene represented by video data of a (first) adaptation set to which the spatial playback region descriptor belongs to. This first region descriptor identifier may be referred to in short as a source identifier.

Further, the descriptor may include one or more parameters (width, height, top_left_x, top_left_y) defining the location (and dimensions) of the source region (expressed in predetermined units). For example, in an embodiment, the parameters associated with the location (and dimensions) of a source region may be expressed as a percentage of a video frame and are multiplied by the video resolution to obtain the exact position in pixel units. For example, if width is 50% and the width of viewing resolution is 1920, the SPR is 960 pixels wide. Instead of a percentage notation other units may also be possible, e.g.: normalized values given as real numbers between 0 and 1; width and height in arbitrary units; and, new total_width and total_height parameters to give the ratio. Hence, in this embodiment, the values regarding dimensions may be expressed as a percentage of the respective video resolution. This way a spatial playback region is not defined in pixel units so that it can be used in case of multiple video resolutions, e.g. in the case when there are multiple Representation in the adaptation sets with different picture resolutions.

A region descriptor may further comprise at least a second region descriptor identifier ("region") for identifying a destination region descriptor associated with a second adaptation set. This parameter may be referred to in short as a destination identifier. The destination identifier signals a server apparatus (e.g. an metadata HTTP-based server apparatus configured to transmit metadata, e.g. a manifest file, to HAS client devices) that the region defined by the source region descriptor refers to a destination region descriptor, i.e. a region descriptor identified by the destination identifier, wherein the destination region descriptor is associated with a further (second) adaptation set.

The spatial playback region descriptor may further comprise a playback period identifier ("period") associated with the destination region identifier signalling a client device that the second adaptation set belongs to the second playback period. This parameter may be referred to in short as a period identifier. Examples of these parameters are provided in Table 2:

TABLE 2

SpatialPlaybackRegion with content selection information

| SpatialPlaybackRegion | Purpose of parameter |
|---|---|
| ... | |
| region | List of SpatialPlaybackRegion@id from which the parent Adaptation Set(s) in the next Playback Period must be selected |
| period | Period@id of the next Playback Period (may not be the next Period in the MPD) |
| label | A word or phrase associated with the SPR |

Hence, the period and destination parameters in the first region descriptor are used to link a region in a first adaptation set to a second region descriptor associated with a second adaptation set of a second playback period. The server apparatus may determine that adaptation sets are linked if the destination parameter of the first region descriptor matches the source parameter of the second region descriptor. An example of this mechanism is described with reference to the MPD in table 3 hereunder.

The region descriptor may further comprise a parameter called "label" that may serve for human readability as well as voice control (matching what the user said and the label). It may serve for visually impaired people, having the application read out or display the text associated with the label so the user can know what to choose.

Table 3 below provides an example of part of a metadata file used by a server apparatus according to an embodiment of the invention. The metadata file may comprise metadata, e.g. MPD elements defining playback periods, adaptation sets, representations, etc. and spatial playback information. The server apparatus may use the metadata to determine an MPD or an MPD update message for a client apparatus. The metadata may be stored in a storage medium, e.g. a database, connected to the server apparatus. The metadata may include a region descriptor according to an embodiment of the invention. In this example, a region may be defined by width, height and the position of its top left corner within a video frame. However, in other embodiments other conditions and/or parameters may be used to define the regions.

In this embodiment, a metadata element, e.g. an MPEG-DASH MPD element, may signal the server apparatus that the video relates to spherical video. In particular, an EssentialProperty MPD element including an @schemeIdUri attribute of value 'urn:mpeg:mpegB:cicp:PF' defining that the video is a 360 video formatted in the equirectangular projection format as specified by the MPEG OMAF specification, ISO/IEC 23090-2.

TABLE 3

Example of a metadata file illustrating the use of a SpatialPlaybackRegion element

```xml
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period id="1">
        <!-- First Playback period -->
        <AdaptationSet segmentAlignment="true" subsegmentAlignment="true" subsegmentStartsWithSAP="1">
            <!-- This SPR links to region 'a' in Period@id=2 -->
            <SpatialPlaybackRegion period="2" region="a" width="50%" height="20%" top_left_x="25%" top_left_y="30%"/>
            <!-- This SPR links to region 'b' in Period@id=3-->
            <SpatialPlaybackRegion period="3" region="b" width="50%" height="20%" top_left_x="50%" top_left_y="50%"/>
            <Representation mimeType="video/mp4" codecs="avc1.42c01e" width="450" height="800" bandwidth="269011" startWithSAP="1">
                <BaseURL>full_video_1_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
    <Period id="2">
        <!-- Second Playback period -->
        <AdaptationSet segmentAlignment="true" subsegmentAlignment="true" subsegmentStartsWithSAP="1">
            <!-- This SPR links to region 'c' in Period@id=4 -->
            <SpatialPlaybackRegion id="a" region="c" period="4" width="100%" height="100%" top_left_x="100%" top_left_y="100%"/>
            <Representation mimeType="video/mp4" codecs="avc1.42c01e" width="450" height="800" bandwidth="269011" startWithSAP="1">
                <BaseURL> full_video_2_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
    <Period id="3">
        <!-- Third Playback period -->
        <AdaptationSet segmentAlignment="true" subsegmentAlignment="true" subsegmentStartsWithSAP="1">
            <!-- This first SPR links to region 'c' in Period@id=4 -->
            <SpatialPlaybackRegion id="b" region="c" period="4" width="100%" height="100%" top_left_x="100%" top_left_y="100%"/>
            <Representation mimeType="video/mp4" codecs="avc1.42c01e" width="450" height="800" bandwidth="269011" startWithSAP="1">
                <BaseURL> full_video_3_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
<Period id="4">
        <!-- Fourth and last Playback period -->
        <AdaptationSet segmentAlignment="true" subsegmentAlignment="true" subsegmentStartsWithSAP="1">
            <!-- This SPR links to no region since it is the last Playback Region in the MPD -->
            <SpatialPlaybackRegion id="c"/>
            <Representation mimeType="video/mp4" codecs="avc1.42c01e" width="450" height="800" bandwidth="269011" startWithSAP="1">
                <BaseURL> full_video_3_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
</MPD>
```

Figure 6:
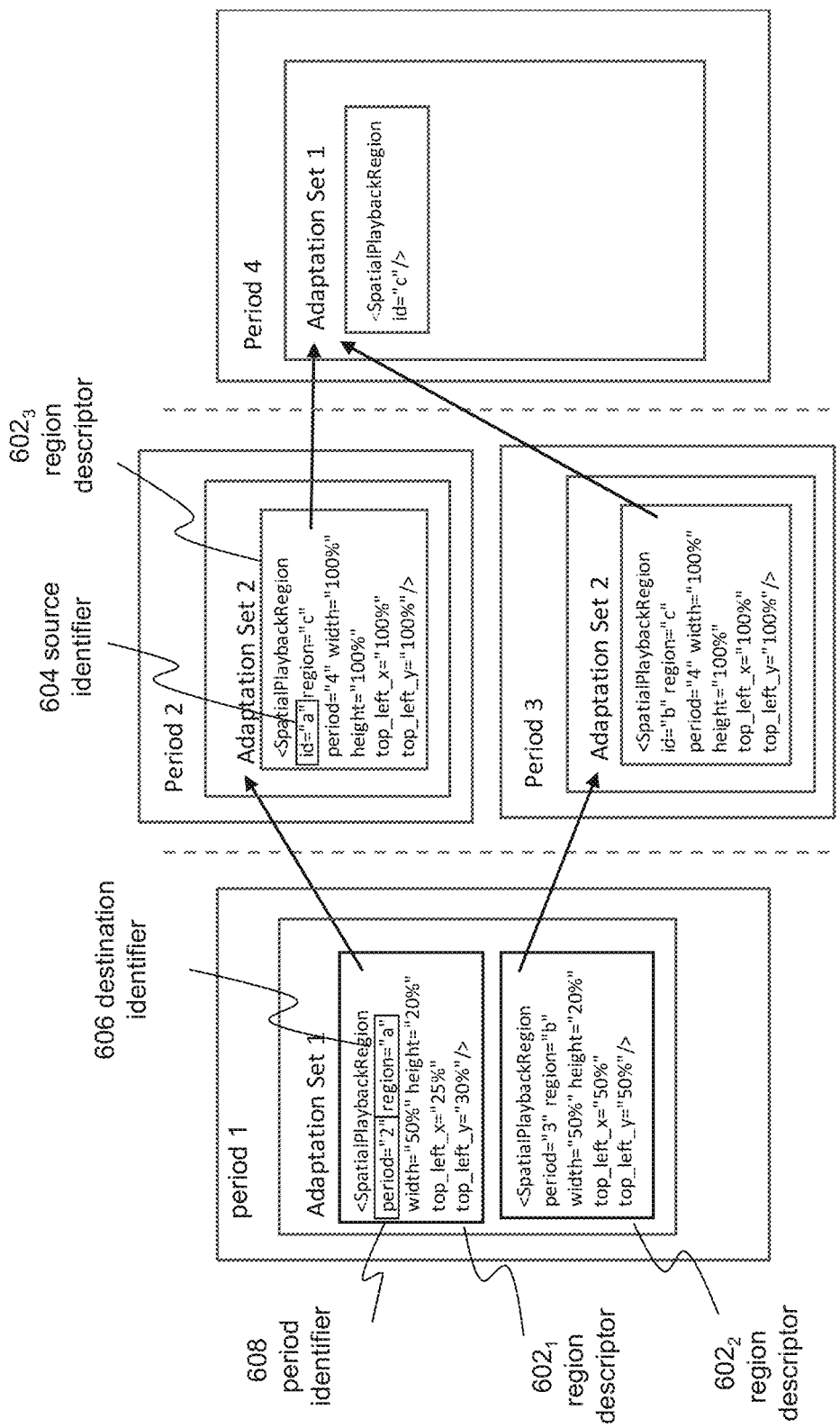
FIG. 6 schematically depicts the linking of adaptation sets in an manifest file using region descriptors according to an embodiment of the invention.

As shown in this embodiment, the metadata file defines a plurality of playback periods (in this example four) which are linked to each other using region descriptors. The linkage of the adaptation sets using region descriptors as described in table 3 is illustrated in FIG. 6. This figure depicts a data structure defining a playback period 1 including an adaptation set 1 which is associated with two regions descriptors $602_1$, $602_2$. The first region descriptor $602_1$:

<SpatialPlaybackRegion period="2" region="a" width="50%" height="20%" top_left_x="25%" top_left_y="30%"/> defines (width, height, and coordinates of) a region which is linked to a further adaptation set 2 of playback period 2. The first region descriptor includes a destination identifier 606 (region="a") and a period identifier 608 (period="2"). The destination and period identifier in the first region descriptor signal the server apparatus that the region described by the first region descriptor is linked to an adaptation set, which is associated with a region descriptor $602_3$ that has a source identifier 604 (id="a") that matches the destination identifier 606 of the first region descriptor $602_1$. The period identifier in the first region descriptor signals the server apparatus that the region descriptor identified by the destination identifier is defined by the metadata of playback period 2. Indeed, as shown in table 3, the metadata of playback period 2 includes a region descriptor with an identifier "a":

<SpatialPlaybackRegion id="a" region="c" period="4" width="100%" height="100%" top_left_x="100%" top_left_y="100%"/>

This way, when parsing the metadata file the server apparatus may determine that the region of a scene represented by video data in adaptation set 1 of playback period 1 is linked to adaptation set 2 of playback period 2. In a similar way, the server apparatus may determine on the basis of the second region descriptor 604 that a further region in the scene represented by video data of adaptation set 1 is linked to an adaptation set 2 of playback period 3 and on the basis of the region descriptors of adaptation set 2 of playback periods 2 and 3 it may determine that regions in the scene represented by video data of adaptation set 2 of playback period 2 and 3 are both linked to adaptation set 1 of playback period 4. This way, when a client apparatus, which is playing back video of a first adaptation set (adaptation set 1), requests the server apparatus to provide metadata of a further adaptation set that needs to be played back after the first adaptation set, it may select the further adaptation set (adaptation set 2) on the basis of the spatial playback information associated with the first adaptation set and navigation information of the client apparatus requesting the metadata.

It is noted that the example of table 3 and FIG. 6 is merely an illustration of how the region descriptors can be used to efficiently link different adaptation sets to each other in order to form a data structure, e.g. an XML data structure, representing multiple playback paths where each playback path may provide a different user experience.

FIGS. 7A and 7B schematically depicts the processing of metadata which a client apparatus receives from a server apparatus as described above. In particular, FIG. 7A schematically depicts the processing of a manifest file 702 which comprises metadata, including manifest file elements, e.g. MPEG-DASH based MPD elements, defining different playback periods 704-708. The manifest file element may define a first playback period (period 1) defining an adaptation set comprising a set of video segments so that the client apparatus can start requesting and playback the video segments of the first adaptation set 704. The further manifest file elements 706, 708 may define further playback periods but do not specifically define the metadata of the adaptation set associated with each of the playback periods. Instead, these further manifest file elements may include an instruction for the client apparatus that the metadata of adaptation sets of these subsequent playback periods should be requested by the client apparatus from the server apparatus, which is configured to determine this metadata on the basis of the metadata as stored in a storage medium connected to the server (see also FIG. 8 hereunder). In this embodiment, the manifest file of the client apparatus thus includes metadata of a first adaptation sets and information instructing the client apparatus to request metadata associated with subsequent adaptation sets from the server. When the server apparatus receives such request, it may selects metadata of a subsequent adaptation set on the basis of the spatial playback information and the navigation information of the requesting client apparatus. This way, the media that is played back depends on the way the user of the client apparatus is "interacting" with the media (e.g. based on viewing behaviour).

In an alternative embodiment, during playback the client apparatus may receive further manifest files comprising metadata of the adapatation sets as determined by the server apparatus. As shown in FIG. 7B, the client apparatus may playback media on the basis of a first manifest file 712 (MPD1) defining an adapation set of a first playback period (period 1). During the playback, the client apparatus may request a subsequent manifest file comprising metadata of a subsequent adapation set, which may be played back after the end of the playback of the first adapation set. In response, the server apparatus may select the further adaptation set on the basis of spatial playback information and navigation information of the requesting client apparatus and sent the metadata to the client apparatus. This metadata may be send to the client apparatus as a new manfiest file or a manfiest file update message (e.g. a patch), which includes metadata to update the current manifest file into a new updated manifest file that includes the metadata of the furter adaptation set. The server apparatus (a metadata serer) may comprise a database in which metadata of all playback paths is stored. When the server apparatus receives a request for metadata associated with one or more selected adaptation sets from a HAS client device, it may parse the metadata database, select the requested part, generate a new MPD or MPD update message and transmit the MPD or MPD update message to the client apparatus.

In an embodiment, an extended version of the MPD chaining scheme as specified in the DASH standard ISO/IEC 23009-1 may be used to transmit the new MPD to the client apparatus. MPD chaining provides a mechanism to indicate that at the end of one media presentation described in a first MPD a new media presentation associated with a subsequent second MPD starts. In the conventional chaining mechanism, the first MPD may include an MPD chaining element, e.g. in the form of an Essential Property MPD element (e.g. urn:mpeg:dash:mpd-chaining:2016) or Supplemental Property element, which points to the location of a server which is configured to transmit a new (second) MPD or MPD update to the HAS client device. A client device that is playing back video on the basis of metadata in the first MPD, will be triggered by the MPD chaining element to request a further MPD so that it can continue video playback on the basis of metadata in the second MPD right after the end of the video playback based on the first MPD.

In yet another embodiment, a next playback period may be signaled using an MPD update event scheme as defined in ISO/IEC 23009-1. In this embodiment, instead of transmitting a complete new MPD, the metadata of the next playback period may be transmitted as an update patch to the HAS client device. The update patch may include the metadata and instructions for the HAS client device to insert the metadata in the manifest file it is using. In an embodiment, an MPD validity expiration event may be inserted in the client's MPD associated with playback time, meaning that a client will download a new MPD at a determined playback time where the MPD ceases to be valid In another embodiment, an MPD validity expiration event may be inserted in a media segment a client device is downloading.

In both cases, when the client device is at the playback time as indicated by the MPD validity expiration event, a new MPD will be sent by the server to the client device. In an embodiment, the server may send the MPD upon expiration or a predetermined time before expiration to the client device. In another embodiment, the client device may request the server to send the MPD before expiration to the client device. The new MPD comprises the next Playback Period and the client device may continue playback in the normal way.

In Table 5 below parameters for such a validity expiration event are provided. The presentation_time and timescale parameters may be content dependent and are used by the client device in order to determine at what time instance in the media playback the client device should receive or request an MPD update.

and a representation including a sequence of media (video) segments, wherein a media segment includes a compressed video data of a predetermined quality.

The server system may include a manifest file generator 804 which may be configured to form a manifest file or an manifest file update patch, which includes metadata to transform a manifest file the client device is currently using, into a manifest file for the next playback period. A manifest file may be referred to in MPEG DASH as a Media Presentation Description (MPD) and may be structured in accordance with a certain machine-readable document format, e.g. XML or the like.

A manifest file may comprise information about media assets, e.g. media streams including video and audio streams, that are available to the client device and information how a client device can retrieve these media assets. In some embodiments, the media stored on the storage medium may also include spatially segmented, i.e. spatially divided ("tiled"), media stream. Such streams may be referred to as (spatial) tile streams. In that case, an adaptation set may define different quality versions of a tile stream and a plurality of adaptation sets may define the tile streams wherein video frames of the plurality of tile streams may be combined into a full video picture. In one embodiment, the spatial relation of the tile streams may be defined using a spatial relationship description (SRD).

TABLE 5

Parameters for a MPD validity expiration event

| Attributes | Purpose of Parameter | Example |
| --- | --- | --- |
| schemeIdUri | Used to signal an MPD event | urn:mpeg:dash:event:2012 |
| value | Defines the type of event. 1 corresponds to an MPD validity expiration | 1 |
| timescale | Provides the timescale, in ticks per second | 5000 |
| presentation_time | The Media Presentation Time of the event, in the timescale from timescale field | 10 000 |

Figure 8:
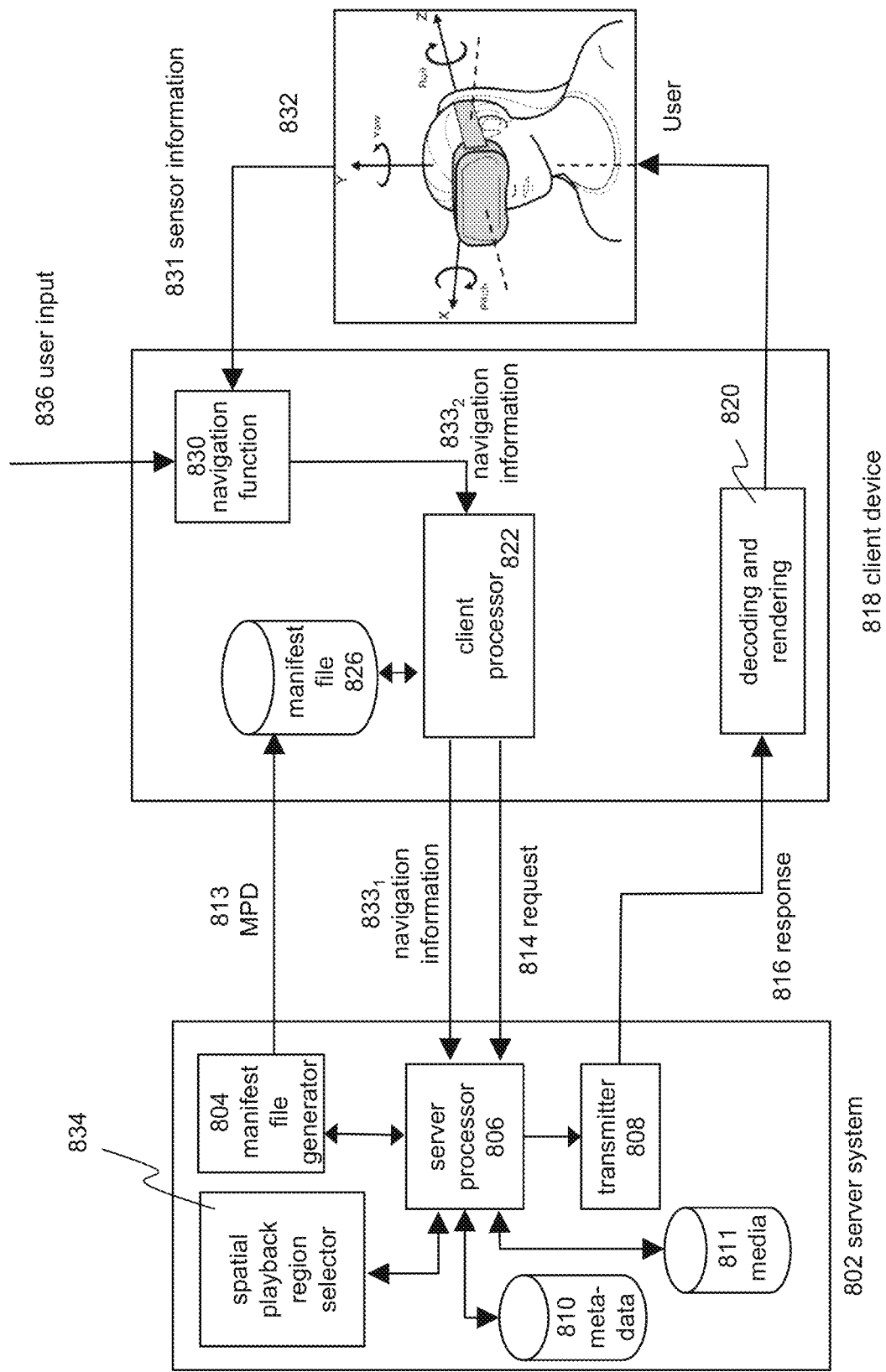
FIG. 8 depicts a system for adaptive streaming of nonlinear media according to an embodiment of the invention.

FIG. 8 depicts a system for adaptive streaming of non-linear media according to an embodiment of the invention. In particular, FIG. 8 depicts a system for server-based adaptive streaming of nonlinear media wherein the system may include a server system 802, including e.g. a metadata server and a media server, and a client apparatus 818 configured to communicate with the server system.

The server system may comprise one or more server processors 806 and one or more server storage media. One storage medium may be configured for storing media data 811, e.g. video/audio (AN) data in a suitable data container format. A further storage medium 810 may be configured to store metadata associated with the media data. The media data may organized on the basis of a suitable data model defined in a media standard such as MPEG DASH or CMAF. Such data format may include playback periods including one or more adaptation sets, an adaptation sets including media representations of different resolution and/or quality Hence, the stored metadata may include both segment identifiers and tile stream identifiers, e.g. in the form of URLs, so that the server is able to determine a manifest file that includes tile stream identifiers. Different ways for signalling the segment and/or tile stream identifiers may be used e.g. URL templating, explicit URLs, etc. The metadata may also include spatial playback information as described above in detail with reference to FIG. 1-7.

A server system as depicted in FIG. 8 may be implemented as a central server system including a metadata server and one or more media servers. Alternatively, the server system may be implemented as a distributed server system including one or more separate metadata servers and one or more media servers. A metadata server may be configured to receive requests for metadata (e.g. a request for a manifest file) from client devices and to send metadata to client devices. Similarly, a media server may be configured to receive requests for media (e.g. a request for one or more video segments) and to send media to client devices. In an embodiment, the server system may be part of a content delivery network (CDN) that is configured to stream video data to client devices.

The client apparatus 818 may comprise a client processor 822 and a memory 826 for storing one or more manifest files, including the manifest file the client device is currently using. The client and server processor may be configured to manage and execute process steps associated with the playback of nonlinear video as described with references to the embodiments in this application. The client device 818 may be implemented or associated with a video processing device 832.

In an embodiment, the video data may include spherical video data, i.e. a spherical representation of video content (e.g. pixels) onto a spherical surface wherein the position of the pixels on the spherical surface may be defined on the basis of a 3D spherical coordinate system. The video processing devices may be configured to process spherical video data and to render the spherical video data for display. The actual rendering surface may not need to be of spherical geometry depending on the projection and mapping use to encode the spherical video data, e.g. cubic geometry. A non-limiting example of a video processing device for spherical content is a head-mounted display (HMD). Such devices are often used in applications that include spherical video, virtual reality and augment reality. An HMD may comprise one or more sensors for tracking head, eye and/or body movements of a user.

In an embodiment, one or more sensors in the video processing device may generate sensor information 831, which may be used to determine a viewpoint, i.e. a direction in 3D space in which the user of the video processing device is looking towards a surface of a sphere, wherein the user is located at the center of the sphere. A viewpoint may be expressed on the basis of coordinates of a spherical coordinate system. A video processing device such as an HMD may be further characterized by a field of view (FOV), i.e. the largest area of the spherical video that the HMD is able to display. At a particular viewpoint at a particular moment in time, the specific part of the spherical video being displayed under the limitation of the FOV is called viewport. The viewport may also be referred to as a region of interest (ROI) on the spherical surface. The video processing device may be configured to render a spherical representation of video content, wherein a user may freely select spherical video by moving the ROI over the spherical surface. The ROI may be moved by moving the video processing device or by tracking head, eye and/or body movements of a user. Hence, during rendering, a viewing direction of a user (e.g. a viewpoint) may be monitored by the video processing apparatus, e.g. a HDM, and used to determine which part of the content should be rendered according to the FOV and the current viewpoint direction of the video processing apparatus.

The sensor information may be sent to the client apparatus, which comprises or may be associated with a navigation function 830, which is configured to receive the sensor information and generate navigation information $833_{1,2}$. The navigation information may include navigation metrics of a user of the video processing device, including one or more parameters that provide information about the viewing behavior of the user. These parameters may include current viewpoints, historic viewpoints and/or other metrics, e.g. motion information, dimensions and shape of the field of view that is displayed to the user, etc. In a further embodiment, the navigation function may receive user input 836 for generating navigation information. The user input may include information related to various user interaction interfaces of the video processing device, e.g. a voice control application and/or a (3D) gesture recognition application. This information may be used in addition to or instead of the viewpoint information.

As shown in FIG. 8, the navigation information may be sent by the client apparatus to the server system. Various ways may be used to send this information to the server. In an embodiment, the navigation information may be sent over a separate communication channel to the server system. In another embodiment, the navigation information may be sent in segment request messages to the server system. In yet another embodiment, the server system may be configured to determine the navigation information from metadata associated with segment request of a client device. For example, in case a so-called tiled media streaming scheme is used to transmit media, e.g. video, to a client apparatus, the server system may determine or derive navigation information on the basis of the tile streams that are requested by the client apparatus. Examples of such embodiments are described in more detail with reference to FIGS. 13 and 14.

The client apparatus may be configured to use metadata in the MPD, e.g. segment identifiers (e.g. URLs) or information to generate segment identifiers, for transmitting request messages 814, e.g. HTTP requests, to the server. The request messages may comprise segment identifiers so that the server system is able to select segments from the storage medium and instruct a transmitter 808 to send the requested video data (e.g. in the form of segments) in one or more response messages 816, e.g. HTTP response messages, to the client apparatus. The video data may be transmitted as a coded bitstream to the client device. A decoding and rendering module 820 associated with the client device may buffer the bitstream, decode it into video frames, transform the video frames into spherical video and render the spherical video using the video processing device.

The client apparatus may be further configured to request the server to transmit a new manifest file, e.g. MPD, e.g. in case all video content in the manifest file is played back or in case the manifest file is outdated. For example, the client device may request a manifest file update (e.g. an MPD update patch) which can be used by the client device to update parts of the manifest file that is stored in the memory of the client device. The MPD update mechanism may be configured to provide the client device with a new MPD or MPD update while it is rendering video on the basis of a current MPD. Alternatively, the client device may be configured to receive a new MPD from the server, without explicitly requesting the server to do so. For example, the current MPD may have metadata in the MPD signaling the client device that the server will transmit a new MPD after a predetermined time. This way continuous playback of the spherical video can be guaranteed.

The manifest file generator 804 may be configured to generate manifest files (MPDs) or manifest file update patches 813 (e.g. MPD update patches). During playback, the client processor may parse the MPD and use metadata in the MPD to playback video data of adaptation sets as defined in the MPD. The server system may select for a client apparatus an adaptation set of a next playback period. To that end, a server-side spatial playback region selector 834 may use the navigation information 833 of client apparatus and the spatial playback information in the metadata stored in the database 810 to select a next adaptation set. The spatial playback information may signal the spatial playback region selector whether video frames of the adaptation set the client is currently playing includes one or more regions, which are linked to one or more further adaptation sets.

A spatial playback region may be defined in different ways. A spatial playback region may be static, i.e. its coordinates are static for the entire playback period it belongs to. Hence, in that case, the coordinates of the spatial playback region may be inserted in the MPD. Table 1 describes an example of a syntax of a static playback region.

In an embodiment, the position and/or the size of a spatial playback region may change over time during a playback period. Such dynamic spatial playback region is very useful if the content creator wants to associate a spatial playback region with a moving object in the scene. To this end, the coordinates of the region may be stored along with the video of the scene in a predetermined file structure. For example, in an embodiment, the coordinates of a region may be stored as a timed metadata track. In an embodiment, the '2dcc' sample entry as specified ISO/IEC 23001-10:2015/FDAmd1 may be used to store the timed metadata track. In this embodiment, a DynamicSpatialPlaybackRegion element may then include attributes as shown in Table 6.

TABLE 6

Dynamic Spatial Region Playback coordinates

| DynamicSpatialPlaybackRegion | Semantic of parameters |
|---|---|
| id | Identifier of the current SPR |
| coordinates | Id of the representation containing the coordinates of the region as timed metadata track |

An example of a metadata file illustrating the usage of a dynamic spatial region playback region is provided in Table 7 below.

TABLE 7 example of metadata file including metadata for a dynamic playback region

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!-First Playback period -->
        <AdaptationSet segmentAlignment="true" subsegmentAlignment="true" subsegmentStartsWithSAP="1">
            <DynamicSpatialPlaybackRegion id="1" coordinates="spr-coordinates"/>
            <Representation id="scene mimeType="video/mp4" codecs="avc1.42c01e" width="450" height="800" bandwidth="269011" startWithSAP="1">
                <BaseURL> full_video_lowres.mp4</BaseURL>
                <SegmentBase indexRangeExact="true" indexRange="837-988"/>
            </Representation>
        </AdaptationSet>
        <AdaptationSet segmentAlignment="true" subsegmentAlignment="true" subsegmentStartsWithSAP="1">
            <Representation id="spr-coordinates" associationId="scene" associationType="cdsc" codecs="2dcc" bandwidth="100">
                <BaseURL>spr_coordinates.mp4</BaseURL>
            </Representation>
        </AdaptationSet>
    </Period>
</MPD>
```

In a further embodiment, instead of an explicit geometric definition, an analytic definition of the region may be used, e.g. as conditions to be met by a pair of points in the 2D space as defined in the SpatialPlaybackRegion element. Table 8 provides an example of a syntax of such analytic definition of a region.

TABLE 8 example of an analytic description of a region

| SpatialPlaybackRegion | Semantic of parameters |
| --- | --- |
| id | Identifier of the current SPR |
| widthGreaterThan | Region is defined as having an x coordinate greater than |
| widthSmallerThan | Region is defined as having an x coordinate smaller than |
| heightGreaterThan | Region is defined as having an y coordinate greater than |
| heightSmallerThan | Region is defined as having an y coordinate smaller than |

In a further embodiment, shaped boundaries between regions may be defined in a SpatialPlaybackRegion element as conditions to be met by a plurality, e.g. a pair, of points in a 2D space. An exemplary syntax of such definition is provided in Table 9:

TABLE 9 example of a region description by drawing lines and/or circles using two points.

| SpatialPlaybackRegionDivider | Semantic of parameters |
| --- | --- |
| Shape | Define the type of the divider: Line Circle Etc.. |
| xValue | Line that is drawn vertically down at the value of width Only present if @shape equals "line" |
| yValue | Line that is drawn horizontally left at the value of height Only present if @shape equals "line" |
| circleCentreX | X coordinate of the centre of circle divider Only present if @shape equals "circle" |
| circleCentreY | Y coordinate of the centre of circle divider Only present if @shape equals "circle" |
| circleRadius | The radius of the circle divider Only present if @shape equals "circle" |

In a further embodiment, a region may be defined using a specific shape, e.g. rectangle or circle. Table 10 below provides the definition of a circular region.

TABLE 10

Circular shaped Spatial Playback Region

| SpatialPlaybackRegion | Semantic of parameters |
| --- | --- |
| Id | Identifier of the current SPR |
| circleCentreX | X coordinate of the centre of the current SPR |
| circleCentreY | Region is defined as a circle, this is the centre of the region |
| circleRadius | The distance a point must be from the circleCentre to be included in the region. This is a percentage of the width. |

In addition, it is also possible to add a shape attribute in the definition of the SpatialPlaybackRegion to enable in the same syntax the choice of several region shapes. In case of implicit signalling of the spatial playback region as shown in Table 7 and 8, separate regions cannot be explicitly indexed by a parametrized value. However, individual identification of a region is required. Hence, in that case, a default ordering of the regions may be proposed.

Figure 9A:
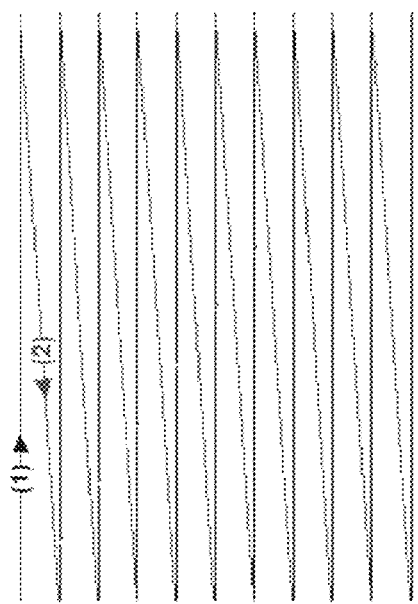
FIGS. 9A and 9B illustrate the identification of spatial playback regions according to an embodiment of the invention.
Figure 9B:
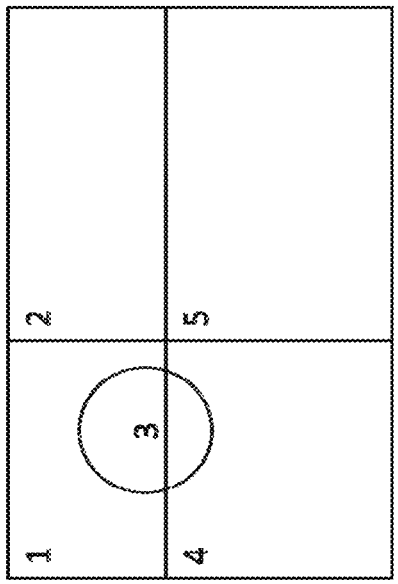

FIGS. 9A and 9B illustrate the identification of spatial playback regions on the basis of a raster scan ordering scheme according to an embodiment of the invention. In FIG. 9A an example of a raster scan order of pixels is provided moving from the top left position to the lower right position. The scanning order may be used for ordering regions. FIG. 9B depicts a video frame comprising a plurality of spatial playback regions $902_{1-5}$ wherein a number (a spatial playback region identifier) may be associated with the regions according to the applied raster scan ordering convention.

The region space of the spatial playback regions may be defined in different ways. The region space of a spatial playback region may either be mapped onto the pictures (e.g. video frames or pictures) of a video or—in case of tiled media streaming—onto the picture formed by a composition of multiple videos.

In an embodiment, the space of a spatial playback region may be defined on the basis of a Cartesian coordinates as e.g. illustrated in the examples of table 1-9 above. In another embodiment, spherical coordinates may be used. Spherical coordinates are especially useful when dealing with spherical video. Spherical coordinates permit a better definition when defining the user's viewpoint in a 360 environment.

Figure 10:
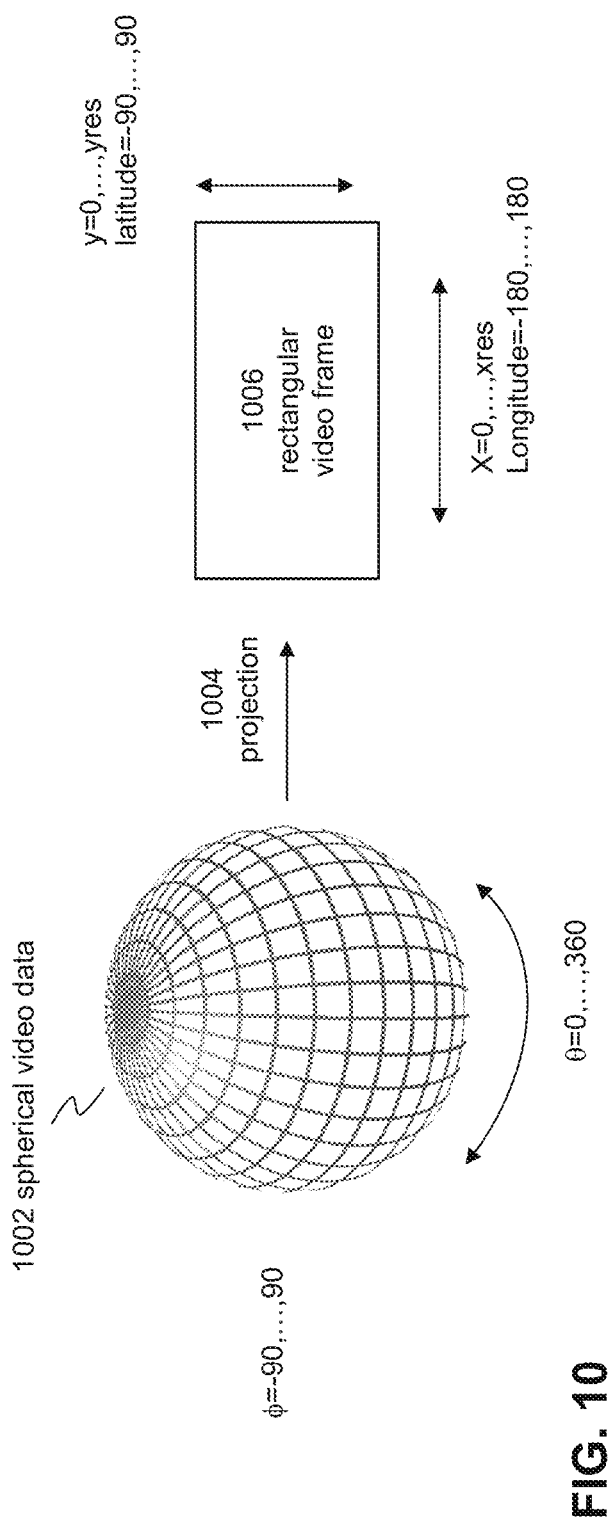
FIG. 10 schematically depicts representations of spherical video data.

FIG. 10 schematically depicts a representation of spherical video data as pixels on a sphere 202 wherein the position of a pixel on the sphere may be described by a longitude and latitude coordinates. Such spherical video data may be generated by a panoramic or 360-degree image capturing system, which typically comprises multiple, i.e. two or more image sensors. Images of overlapping field of views, generated by different image sensors, may be stitched together into one panorama or high-resolution image. As state-ofthe-art codec standards are not capable of handling spherical video data, the spherical video data are transformed into a 2D video frame format before the video data are provided to the input of a video encoder. Such transformation typically includes a projection operation 1004 which projects the 3D spherical video data onto a 3D rectangular area of a video frame 1006. In an embodiment, an equirectangular projection operation may be used to directly transform pixels associated with spherical coordinates φ,θ to pixels associated with planar 2D coordinates X,Y. Instead of an equirectangular projection another projection may be used, e.g. a cubic projection, wherein the sphere is placed in a 3D cube and wherein pixels on the sphere are projected on the 2D surfaces of the cube. The 2D surfaces are subsequently arranged in a 2D rectangular format that can be processed by a state of the art encoder.

Figure 11B:
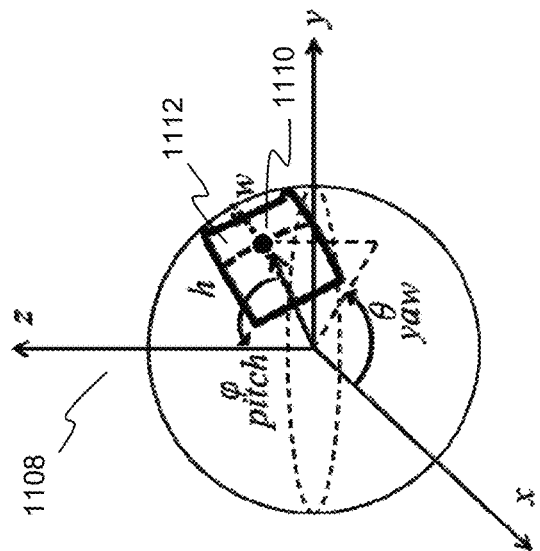
FIGS. 11A and 11B illustrate the use of a spherical coordinate system for describing a viewport.
Figure 11A:
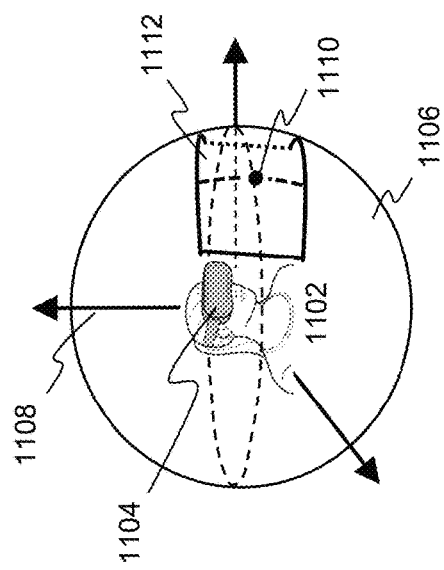

FIGS. 11A and 11B illustrate the use of a spherical coordinate system for spherical video. FIG. 11A depicts a user 1102 associated with or wearing a video processing device 1104, which is configured to render spherical video. The user is positioned in the center of a sphere 1106 and the viewing direction of a user viewing the direction of a viewpoint 1110 on the sphere may be defined with respect to the axis of a 3D Cartesian coordinate system 1108. The video processing device is configured to request and receive content, including spherical content, from the network and to render spherical content in a viewport 1112, a region of interest on the sphere, to the user.

FIG. 11B illustrates a viewport defined on the basis of a 3D spherical coordinate system, wherein a yaw-pitch-roll Euler angle convention system may be used to represent the rotation of the viewer heads in a 3D Cartesian coordinate system. A radius, elevation, azimuth angular coordinate system (also known as spherical coordinate system) may be used to represent regions on a sphere. Here, the azimuth ranges between 0 and 360 degrees, and elevation range between −90 and +90. The starting (0-degrees) position of the yaw axis may be chosen arbitrarily by a content provider, or be consistent with the cardinal directions with 0 and 360 degrees representing North, 90 degrees representing East, 180 degrees representing South and 270 degrees representing West. For the pitch axis, the positive values may represent direction above the horizon and negative values represent directions below the horizon. For the roll axis, the assumption may be made that positive values indicate that the left eye of the user is higher than the right eye, and conversely negative values indicate that the user's head is tilted in the opposite way (with the left eye being lower than the right eye).

In an embodiment, three angular parameters (a spherical viewport coordinate) may be used to indicate the position of the ROI on the sphere. In an embodiment, the three elevation-azimuth-orientation angles (θ, φ, ψ) may be used to indicate the direction of the viewport (the center of the viewport being located on the sphere at the position r, θ, φ) and the orientation ψ of the viewport. The boundaries of the viewport may be preconfigured in the client device or may be determined by the client device based on the FOV. Additionally, the boundaries of the viewport may be based on information on where the viewport needs to be projected.

In an embodiment, the viewport on a sphere may have the shape of a spherical polygon. For these polygons, it holds that each side is defined a line segment of a great-circle. For example, the viewport 1112 depicted in FIG. 11B illustrates a spherical polygon that has the shape of a rectangular on a sphere. A number of angular coordinates may be used to define a such rectangular spherical polygon. For example, five angular coordinates may be used to define a rectangular ROI on the sphere, including: θ, φ, ψ, the three elevation-azimuth-orientation angles to indicate the viewport direction (the viewpoint being the center of the viewport on the sphere being at the position r, θ, φ) and the orientation of the viewport ψ and the parameters w, h: where w represents the viewport's width in degrees of arc and h represents the viewport's height in degrees of arc. Here the height h may be defined as a segment on the great-circle passing through the viewport's center and having bearing equal to ψ. Similarly, the width w may be defined as a segment that is located on the great-circle passing through the viewport's center and substantially orthogonal to the great-circle associated with the height h.

In an embodiment, the coordinate system for describing the viewport of the user may be used to define a spatial playback region on a spherical surface. For example, in an embodiment, a spatial playback region on a sphere may be defined using lower and upper ranges of both angles yaw and pitch. A definition of such region is provided in Table 11.

TABLE 11

Analytic Spatial Playback Region definition on a sphere

| SpatialPlaybackRegion | Semantic of parameters |
| --- | --- |
| Id | Identifier of the SPR |
| yawMin | Beginning of yaw in degrees from the origin |
| yawMax | End of yaw in degrees from the origin |
| pitchMin | Beginning of pitch in degrees from the origin |
| pitchMax | End of pitch in degrees from the origin |

In a further embodiment, a spatial playback region on a sphere may be defined by a point on the sphere, e.g. its center, its size and its shape, i.e. the geometric objects that define the boundaries of the spatial playback region on the sphere. An example of a definition of such region is provided in Table 12.

TABLE 12

Geometric Spatial Playback Region definition on a sphere

| SpatialPlaybackRegion | Semantic of parameters |
| --- | --- |
| Id | Identifier of the SPR |
| center_yaw | Center point yaw orientation |
| center_pitch | Center point pitch orientation |
| roll | Roll angle of the SPR |
| hor_range | The width of the SPR in degrees |
| ver_range | The height of the SPR in degrees |

TABLE 12-continued

Geometric Spatial Playback Region definition on a sphere

Figure 12B:
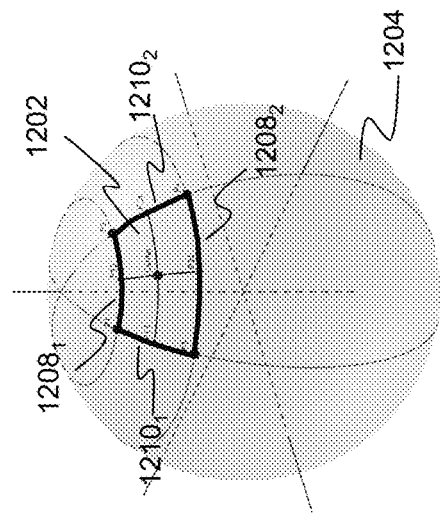
FIG. 12A and FIG. 12B depict examples of a spatial playback region on a spherical surface according to various embodiments of the invention.
Figure 12A:
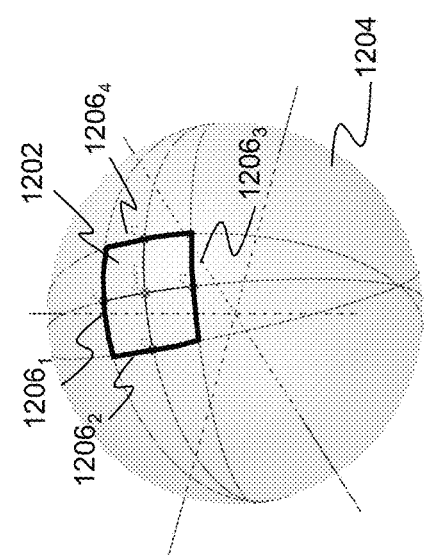

| SpatialPlaybackRegion | Semantic of parameters |
|---|---|
| shape_type | The geometric objects that define the region boundary<br>"0" specifies that the region is specified by four great circles as shown in FIG. 12A<br>"1" specifies that the region is specified by two yaw circles and two pitch circles as illustrated in FIG. 12B |

FIG. 12A and FIG. 12B depict examples of a spatial playback region on a spherical surface according to various embodiments of the invention. In particular, FIG. 12A depicts an example of a spherical description of a spatial playback region 1202 on a spherical surface 1204 using four great circles $1206_{1-4}$. FIG. 12B depicts an example of a region 1202 on the spherical surface 1204 specified by two yaw circles $1208_{1,2}$ and two pitch circles $1210_{1,2}$.

In some embodiments, a so-called tiled video streaming scheme may be used to playback nonlinear media using the viewpoint of a user of a video processing device. In such tiled video streaming scheme, video content, e.g. a high-resolution panorama video or a high-resolution spherical video, may be either formatted as a set of independent tile streams or as a one HEVC video stream comprising HEVC tiles. The manifest file may define one or more tile stream identifiers for identifying tile streams, each tile stream may comprise video data of a spatial subpart of pictures of a source video, e.g. a large panorama video or a spherical video. For example, a tile may define a spatial subpart of a 2D flat panorama video picture so that a tile stream may define an independent video stream wherein the video frames of a tile stream represent a subpart of the video scene represented by the video frames of the panorama video. Similarly, a tile may define a spatial subpart of a spherical surface. In that case, a tile stream may define an independent video stream wherein the video frames of such tile stream represent a spatial subpart of the video scene represented by video frames of the spherical video. Here, the video frames of a tile stream may comprise projected spherical video data, i.e. spherical video data projected onto a 2D flat plane so that the video data can be processed by a conventional codec that is adapted to process video data in the form of flat 2D video frames. In both cases, a client apparatus only downloads the part of the scene (panorama or spherical) that coincides with the current viewport of the user. To that end, the client selects tiles that coincide with the current viewpoint and/or viewport.

In order to facilitate a tile streaming scheme, an MPD may comprise a so-called spatial relationship description (SRD) to express that different adaptation sets associated with different tile streams together may be used to compose a full scene. This full scene may be referred to as the reference space (or video picture) in which the position of the tiles is defined. The SRD thus also defines the spatial relation between the different video tiles and includes the following parameters:

| parameter | Description |
|---|---|
| object_x | Top-left corner coordinate of the tile video on the x-axis |
| object_y | Top-left corner coordinate of the tile video on the y-axis |
| object_w | The width of the tile video |
| object_h | The height of the tile video |

Note that this coordinate are expressed in arbitrary unit as specified by the so-called SRD.

An Adaptation Set in an MPD may include an SRD descriptor (element) that is defined using the syntax of the extended "SRD for VR" proposal of MPEG contribution ISO/IEC JTCC1/SC29/WG11 MPEG2016/m38605, which discloses modifications to a conventional SRD. In particular, an SRD for VR and 360 video services incudes a parameter space within the SupplementalProperty element or EssentialProperty element whose value indicates the type of the spherical video representation. In the SRD for VR scheme the semantics of the conventional SRD parameters are changed in the sense that coordinates parameters object_x and object_y represent the central position of a tile (also sometimes referred to as a spatial subpart). These parameters represent yaw and pitch angles providing an improved compatibility with the way in which VR or spherical rendering systems process viewpoints. Similarly, the parameters object width and object height may represent the width and height of a tile in terms of angular length of the tile on a spherical surface.

Table 13 provides an example of a metadata file including metadata for playout of tiled media.

TABLE 13 metadata file defining playback regions in combination with spatial relationship description (SRD)

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!--First Playback period -->
        <AdaptationSet id="left" segmentAlignment="true" subsegmentAlignment="true" subsegmentStartsWithSAP="1">
            <!- Tiled panoramoa - video left part -->
            <SupplementalProperty schemeIdUri="urn:mpeg:dash:srd:2014" value="0,0,0,1,1,2,1"/>
            <SpatialPlaybackRegion id="1" width="70%" height="100%" top_left_x="0%" top_left_y="0%"/>
```

TABLE 13-continued metadata file defining playback regions in combination with spatial relationship description (SRD)

```
            <Representation mimeType="video/mp4" codecs="avc1.42c01e" width="450" height="800" bandwidth="269011" startWithSAP="1">
                <BaseURL> full video lowres.mp4</BaseURL>
                <SegmentBase indexRangeExact="true" indexRange="837-988"/>
            </Representation>
        </AdaptationSet>
        <AdaptationSet id="right" segmentAlignment="true" subsegmentAlignment="true" subsegmentStartsWithSAP="1">
            <!- Tiled panoramoa - video right part -->
            <SupplementalProperty schemeIdUri="urn:mpeg:dash:srd:2014" value="0,1,0,1,1,2,1 "/>
            <SpatialPlaybackRegion id="2" width="70%" height="100%" top_left_x="30%" top_left_y="0%"/>
            <Representation mimeType="video/mp4" codecs="avc1.42c01e" width="450" height="800" bandwidth="269011" startWithSAP="1">
                <BaseURL> full_video_lowres.mp4</BaseURL>
                <SegmentBase indexRangeExact="true" indexRange="837-988"/>
            </Representation>
        </AdaptationSet>
    </Period>
</MPD>
```

In an embodiment, when SRD elements (defining tiled media) are used in conjunction of the spatial playback information as described in this application, the coordinates and dimensions of the spatial playback regions are not defined in terms of a video resolution of a representation in the parent adaptation set, in terms of the reference space defined by the SRD element. For example, in the MPD example of Table 13, the SpatialPlaybackRegion identified by source identifier @id "1" belongs to the Adaptation Set with @id "left" which also has includes an SRD element including the parameters value="0,0,0,1,1,2,1". As a result, the top_left_x, top_left_y, width and height attributes of the spatial playback region (which may be defined on the basis of the syntax of table 1) may be defined relative to the reference space of the SRD element, i.e. to total_width and total_height attributes of the SRD having in this example the values "2" and "1" respectively. Concretely, this implies the following mapping:

Region width=width*total_width
Region width=0,7*2
Region width=1,4
Region height=height*total_height
Region height=1*1
Region height=1

Therefore, SpatialPlaybackRegion with @id "1" converts the region in SRD space from point (0;0) and of size (1,4;1). Using the reference space of the SRD element instead of the video resolution for calculating the position and size of the region, allows to decouple tile boundaries and spatial playback region boundaries which are two different functional tools used by two different entities, the service provider and the content creator respectively.

As described with reference to FIG. 8, different ways may be used to send the navigation information to the server system. Different embodiments are described hereunder in greater detail.

In an embodiment, the client device may send its current viewport (or viewpoint) as navigation information to network node (e.g. a server) associated with the HAS system. The navigation information may comprise information about the position of the viewpoint and/or the viewport of the user. In addition, the information may also contain an identifier of the client device sending the information. This way, the server, typically an HTTP server, may determine the video data associated with the viewpoint and/or viewport (e.g. the tile streams associated with the spatial tiles that coincide or at least partly coincide with the viewport of the user) that should be transmitted to a client device requesting content.

In an embodiment, a separate communication channel between a HAS client and (a network node, e.g. a server, of) the network may be used to transmit the navigation information the network. In an embodiment, the communication channel may be implemented as a Websocket-type communication channel.

In another embodiment, the communication channel may be an asynchronous communication channel between a DASH client and DASH Aware Network Element (DANE). This communication channel is defined in the MPEG DASH part 5 Server And Network-assisted DASH (SAND) specification. DANEs and DASH client devices may be configured to exchange standardized SAND messages to enhance the DASH client operations and the delivery of DASH segmented content. The use of a DANE communication channel may be signalled in the MPD using the schemeIdUri="urn:mpeg:dash:sand:channel:2016 descriptor.

In an embodiment, an MPD author may use the xlink feature of the MPEG DASH standard to request an adaptation set of a next Period from the server. In this embodiment, the MPD received by the client device comprises the structure of the media timeline including metadata of a first playback period element, e.g. a first Period MPD element, and metadata of one or more further playback periods, e.g. further Period MPD elements, wherein the metadata of the first playback period may define one or more adaptation sets, wherein each adaptation set may be associated with one or more representations. Each representation may define video and/or audio data of a predetermined resolution and/or quality. A representation may include a set of segment identifiers or information for determining a set of segment identifiers.

In this embodiment, the metadata of the one or more further playback periods do not contain the metadata defining the further adaptation sets. Instead, the metadata of each of these further adaptation sets may include an instruction to the client device to request a server to transmit metadata of the further adaptation set in a response message to the client device. The request and responses messages may be transmitted over a separate (bi-directional) communication channel between the client device and the network (such as a WebSocket communication channel or a DANE communication channel). In an embodiment, such instruction may be implemented as one xlink element.

When using the metadata in the manifest file to request the video content, the client device will parse the MPD and retrieve and playout the video data of the first playback period. During the playback, the client device may determine that the subsequent second playback period listed in the MPD includes an xlink element, instructing the client device to resolve the xlink at a predetermined moment in time. In an embodiment, the resolution may be a just-in-time playback period resolution so that the video data of a second adaptation set is received by the client device when the playback of the video data of an adaption set of the first adaptation set is finished. This way, continuous playback of video data is guaranteed.

Upon resolution of an xlink element, the client device will request the server to send metadata of a next playback period to the client device, wherein the server may determine an adaptation set of the next playback period on the basis of viewpoint information and spatial playback information. In an embodiment, the viewpoint information may be transmitted via a separate communication channel between the client device and the network, e.g. a DANE communication channel, to the server. Alternatively, in another embodiment, the server may determine viewpoint information of the user from the tile streams requested by the client device.

As it is an aim of the invention to personalize the content based on the previous rendered regions of the content, the resolution (selection) of the next playback period by the server preferably may be executed as close as possible to the end of the playback period. This way the resolved playback period does offer content in line (where "in line" is to be defined by the content creator) with the viewing behaviour observed in the previous playback period. Additionally, the resolution of the playback period may be executed sufficiently prior to the boundary of the playback period it is currently playing so that playback of content can be guaranteed in an uninterrupted fashion. Table 15 below is an example of such MPD including xlink information and transmission of viewpoint information via a SAND channel to the server.

TABLE 15

MPD including xlink information and metadata for transmission of viewpoint and/or viewport information via a SAND channel a the server

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <!-- First Playback period -->
    <Period>
        <AdaptationSet id="left" segmentAlignment="true" subsegmentAlignment="true" subsegmentStartsWithSAP="1">
            <!-- Tiled panoramoa - video left part -->
            <SupplementalProperty schemeIdUri="urn:mpeg:dash:srd:2014" value="0,0,0,1,1,2,1"/>
                <Representation mimeType="video/mp4" codecs="avc1.42c01e" width="2048" height="2160" bandwidth="269011" startWithSAP="1">
                    <BaseURL>left_video.mp4?clientId=abcd</BaseURL>
                    <SegmentBase indexRangeExact="true" indexRange="837-988"/>
                </Representation>
        </AdaptationSet>
        <AdaptationSet id="right" segmentAlignment="true" subsegmentAlignment="true" subsegmentStartsWithSAP="1">
            <!-- Tiled panoramoa - video right part -->
            <SupplementalProperty schemeIdUri="urn:mpeg:dash:srd:2014" value="0,1,0,1,1,2,1"/>
                <Representation mimeType="video/mp4" codecs="avc1.42c01e" width="2048" height="2160" bandwidth="269011" startWithSAP="1">
                    <BaseURL>right_video.mp4?clientId=abcd</BaseURL>
                    <SegmentBase indexRangeExact="true" indexRange="837-988"/>
                </Representation>
        </AdaptationSet>
    </Period>
    <!-- Second Playback period -->
    <Period xlink:href="remote.period" xlink:actuate="onRequest" xmlns:xlink="http://www.w3.org/1999/xlink"></Period>
    <!-- Third Playback period -->
    <Period xlink:href="remote.period" xlink:actuate="onRequest" xmlns:xlink="http://www.w3.org/1999/xlink"></Period>
    ...
    <!-- Last Playback period -->
    <Period xlink:href="remote.period" xlink:actuate="onRequest" xmlns:xlink="http://www.w3.org/1999/xlink"></Period>
    <Metrics metrics="viewpoint,fov">
        <Reporting schemeIdUri="urn:mpeg:dash:sand:channel:2016" value="sand-channel"/>
        <Range @duration="1" />
    </Metrics>
    <sand:Channel id="sand-channel" schemeIdUri="urn:mpeg:dash:sand:channel:websocket:2016" endpoint="wss://server.example.com?clientId=abcd">
</MPD>
```

As defined in MPEG DASH part 1, the "onRequest" value for the actuate parameter in the MPD may be understood as follows: "according to W3C Xlink, an application should dereference the remote element entity only on a post-loading event triggered for the purpose of dereferencing". In the context of this Part of ISO/IEC 23009, the application dereferences the link only for those resources it needs (or anticipates it probably will need) and at the time when it needs the content of the remote element entity for playout. Examples include dereferencing a link in a playback period element when the play-time is expected to enter that playback period, dereferencing an adaptation set link when it appears to contain representations that will be needed, and so on.

The Metrics element may be used in accordance with the MPEG DASH part 5, ISO/IEC 23009-5:2017 specification. In this case, the Metrics element nay instruct a DASH client device to collect viewpoint or viewport information e.g. metrics identified by the keys "viewpoint" and "fov". Examples of such metrics are described in an MPEG input contribution m40333 Metrics and SAND Messages for DASH-VR on Mar. 28, 2017, ISO/IEC JTC1/SC29/WG11 MPEG 118/m40333, "Metrics and SAND Messages for DASH-VR", Ali C. Begen, Yong He, Yan Ye, Yago Sanchez, Thomas Schierl, April 2017, Hobart, Australia.

Additionally, the Reporting element of the Metrics element may signal the client device that a SAND channel should be used whose id is "sand-channel". Further, the Range element may instruct the client device the collection of metrics associated with a predetermined period (in this example a 1 s period) and then send the collected metrics to the server.

The MPD may also comprise information about the SAND channel as provided in the sand:Channel element. The URL of the channel may further comprise a client device identifier, a clientID parameter, allowing the DANE and the media server to relate the metrics sent and the segment requests to a client device that is associated with the client device identifier.

In a further embodiment, a client device may send navigation information (e.g. information about its current viewpoint and/or viewport) to the server as part of the segment requests. Further, the xlink feature may be used to instruct a server to transmit metadata of an adaptation set of a next playback period to the client device using an MPD update in the same way as described above with reference to table 15 above. In this embodiment however, the navigation information is sent in or along with the segment requests instead of a separate communication channel (such as a DANE communication channel). An example of an MPD comprising metadata to realize this embodiment is illustrated in table 16. An MPD can be accessed using the URL http://www.example.com/movie.mpd?vp=$urn: example:viewport$, and the attribute "urn:example:viewport" signals a client device that it should insert its current viewport in a segment request message.

TABLE 16

MPD including xlink information and transmission of viewpoint information via request messages to the server

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <!-- First Playback period -->
    <Period>
        <AdaptationSet id="left" segmentAlignment="true" subsegmentAlignment="true" subsegmentStartsWithSAP="1">
            <!-- Tiled panoramoa - video left part -->
            <SupplementalProperty schemeIdUri="urn:mpeg:dash:srd:2014" value="0,0,0,1,1,2,1"/>
            <SupplementalProperty schemeIdUri="urn:mpeg:dash:urlparam:2014" xmlns:up="urn:mpeg:dash:schema:urlparam:2014">
                <up:UrlQueryInfo queryTemplate="$querypart$" useMPDUrlQuery="true"/>
            </SupplementalProperty>
            <SupplementalProperty schemeIdUri="urn:example:viewport"/>
            <SegmentTemplate duration="2" startNumber="1" media="left_video_$Number$_$Bandwidth$bps.mp4">
                <Representation mimeType="video/mp4" codecs="avc1.42c01e" width="2048" height="2160" bandwidth="269011" startWithSAP="1"/>
        </AdaptationSet>
        <AdaptationSet id="right" segmentAlignment="true" subsegmentAlignment="true" subsegmentStartsWithSAP="1">
            <!-- Tiled panoramoa - video right part -->
            <SupplementalProperty schemeIdUri="urn:mpeg:dash:srd:2014" value="0,1,0,1,1,2,1"/>
            <SupplementalProperty schemeIdUri="urn:mpeg:dash:urlparam:2014" xmlns:up="urn:mpeg:dash:schema:urlparam:2014">
                <up:UrlQueryInfo queryTemplate="$querypart$" useMPDUrlQuery="true"/>
            </SupplementalProperty>
            <SupplementalProperty schemeIdUri="urn:example:viewport"/>
            <SegmentTemplate duration="2" startNumber="1" media="right_video_$Number$_$Bandwidth$bps.mp4">
                <Representation mimeType="video/mp4" codecs="avc1.42c01e" width="2048" height="2160" bandwidth="269011" startWithSAP="1"/>
        </AdaptationSet>
    </Period>
    <!-- Second Playback period -->
    <Period xlink:href="remote.period" xlink:actuate="onRequest" xmlns:xlink="http://www.w3.org/1999/xlink"></Period>
```

TABLE 16-continued

MPD including xlink information and transmission of viewpoint
information via request messages to the server

```
    <!-- Third Playback period -->
    <Period xlink:href="remote.period" xlink:actuate="onRequest"
xmlns:xlink="http://www.w3.org/1999/xlink"></Period>
...
    <!-- Last Playback period -->
    <Period xlink:href="remote.period" xlink:actuate="onRequest"
xmlns:xlink="http://www.w3.org/1999/xlink"></Period>
</MPD>
```

The SupplementalProperty with schemeIdUri="urn:mpeg:dash:urlparam:2014" signals the client device that the navigation may be appended in the query string section of a segment request. In particular, the up:UrlQueryInfo with queryTemplate="$querypart$" and useMPDUrlQuery="true" instructs the client to take the entire query part of the MPD URL, i.e. in this case vp=$urn:example:viewport$, and to use this as template for the query string of all segment requests. The DASH client will then build the following segment URLs:

http://www.example.com/right_video_highres_1_269011 bps.mp4?clientId=abcd&vp=160,200, 0,90,90
http://www.example.com/right_video_highres_2_269011 bps.mp4?clientId=abcd&vp=165,210, 0,90,90
http://www.example.com/left_video_highres_3_269011 bps.mp4?clientId=abcd&vp=170,220,0, 90,90 . . . .

Here it is assumed that the format of the "vp" parameter defined by urn:example:viewport includes a list of values: center_viewport_elevation, center_viewport_azimuth, viewport_roll, viewport_width, viewport_height.

As described with reference to FIG. 8, in some embodiments, the media that is adaptively streamed to a client apparatus may include spatially segmented, i.e. spatially divided ("tiled") media. A stream comprising such spatially segmented media may be referred to as a (spatial) tile stream. In such case, the navigation information may be derived from metadata associated with tile streams requested by a client apparatus.

Figure 13A:
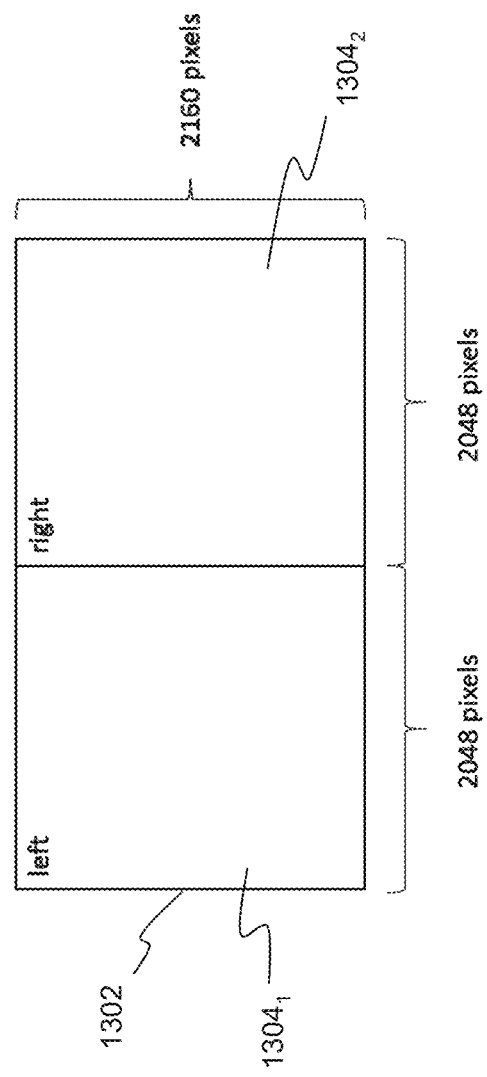
FIGS. 13A and 13B depicts an example of non-linear playback of spherical video according to an embodiment of the invention.

FIG. 13A depicts a video frame 1302 of a temporal sequence of video frames of a source video stream, wherein each video frame comprises pixels representing the full scene of the source video. As shown in this figures, the video frame is spatially divided into a plurality (in this example two) tiles $1304_{1,2}$, a first video tile (or in short a tile) that includes content represented by pixels of a first part (the left part) of the scene of the source video and a second video tile that includes content represented by pixels of a second part (the right part) of the scene of the source video. Video pictures (video frames) of a copy of a source video stream may be spatially divided into spatial subparts (a tile) and a temporal sequence of tiles representing one spatial subpart of the full scene (of the source video) may collected and formatted into a separate video stream using a suitable data container (e.g. an MPEG video stream). A video stream comprising video data representing a spatial subpart (a tile) of the video pictures (video frames) of a source video file may be referred to as a tile stream. For example, in the example of FIG. 13A, a copy of the source video stream may be used to generate two separate tile streams, wherein each of these tile streams may be associated with a tile stream identifier, e.g. an URL in a manifest file. This process may be repeated for different quality copies of the source file so that each tile stream may be available in different video qualities.

Figure 13B:
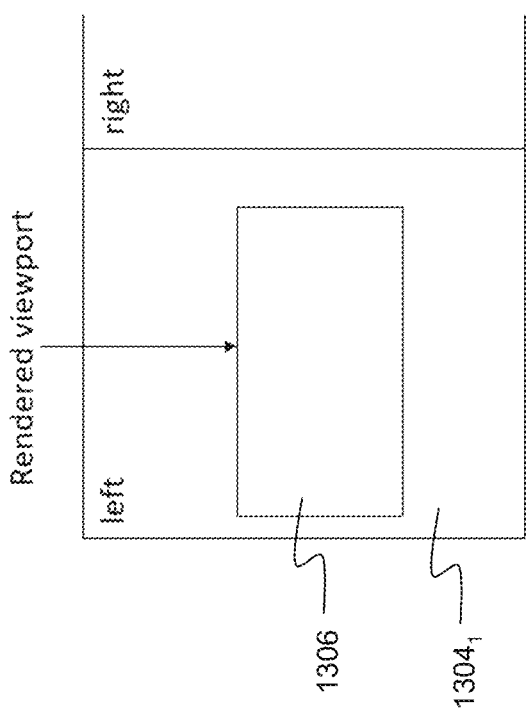

The client apparatus may be configured to request (one or more) individual tile streams including video frames that comprise content that is located (at least partly) within the viewport of the user. In this example, the user may have zoom into a region of the picture of the source video stream. Hence, in that case, the client device will no longer request the source video stream (or all the tile streams) that compose the full scene of the source video, but only the tiles that cover the viewport. FIG. 13B depicts a rendered viewport 1306 which is mapped on the one or more tiles (in this case tile $1304_1$) that are requested by a client device. As shown in FIG. 13B, the location of the viewport is located completely within the first (left) video tile so that the client device will only requests the left tile stream.

In an embodiment, the server apparatus may use metadata associated with requested tile streams, in particular the position of the one or more tiles within the full scene, for determining or at least estimating a viewpoint of the user. In order to allow the server to determine a viewpoint of a user of a particular client device, the server should be able to distinguish between HTTP requests of different clients. To that end, a client may send a client identifier (ID) in the request to the server. For example, in an embodiment, the URL of the tile streams may be associated with a query parameter representing a client ID. The query parameter may be used by the client device to insert a client ID, which will allow the server to distinguish between different requests of different client devices.

Table 14 below provides an example of an MPD including a query parameter representing a client ID.

TABLE 14

MPD for SRD-based tiled streaming including a query parameter
for associating a tile request with a client device.

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
```

TABLE 14-continued

MPD for SRD-based tiled streaming including a query parameter
for associating a tile request with a client device.

```
<Period>
    <!-First Playback period -->
    <AdaptationSet id="left" segmentAlignment="true" subsegmentAlignment="true" subsegmentStartsWithSAP="1">
        <!- Tiled panoramoa - video left part -->
        <SupplementalProperty schemeIdUri="urn:mpeg:dash:srd:2014" value="0,0,0,1,1,2,1"/>
            <Representation mimeType="video/mp4" codecs="avc1.42c01e" width="2048" height="2160" bandwidth="269011" startWithSAP="1">
                <BaseURL> left video highres.mp4?clientId=abcd1234</BaseURL>
                <SegmentBase indexRangeExact="true" indexRange="837-988"/>
            </Representation>
    </AdaptationSet>
    <AdaptationSet id="right" segmentAlignment="true" subsegmentAlignment="true" subsegmentStartsWithSAP="1">
        <!- Tiled panoramoa - video" right part -->
        <SupplementalProperty schemeIdUri="urn:mpeg:dash:srd:2014" value="0,1,0,1,1,2,1"/>
            <Representation mimeType="video/mp4" codecs="avc1.42c01e" width="2048" height="2160" bandwidth="269011" startWithSAP="1">
                <BaseURL> right_video_highres.mp4?clientId=abcd1234</BaseURL>
                <SegmentBase indexRangeExact="true" indexRange="837-988"/>
            </Representation>
    </AdaptationSet>
</Period>
</MPD>
```

As described with reference to FIGS. 13A and 13B, a server receiving segment request messages of a predetermined client device to transmit one or more tile streams may be configured to monitor which tile streams a certain client device has requested and to use this information to select an adaptation set for the next playback period. In this case it may be assumed that a client device is requesting all segments and MPD from the same server, or that the servers involved are communicating all information about a client device to the server responsible for updating the client's MPD.

In order to determine a viewpoint and/or a viewport of a client device, the server may determine which tile streams that have been requested by the client device and determine, or at least estimate, on the basis of the metadata of the requested tile streams the viewpoint and/or viewport of the user. Typically, the viewpoint may be considered as center of the viewport (assuming gaze tracking is not working or not taken into account).

Since the viewport is not known with full precision, the server may use the metadata of the segments being requested in order to determine the location of the viewport. For example, in an embodiment, the viewpoint may be calculated as a geometric average of spatial position of the requested tiles within video pictures of a source file from which the tile streams are derived.

Figures 14A, 14B:
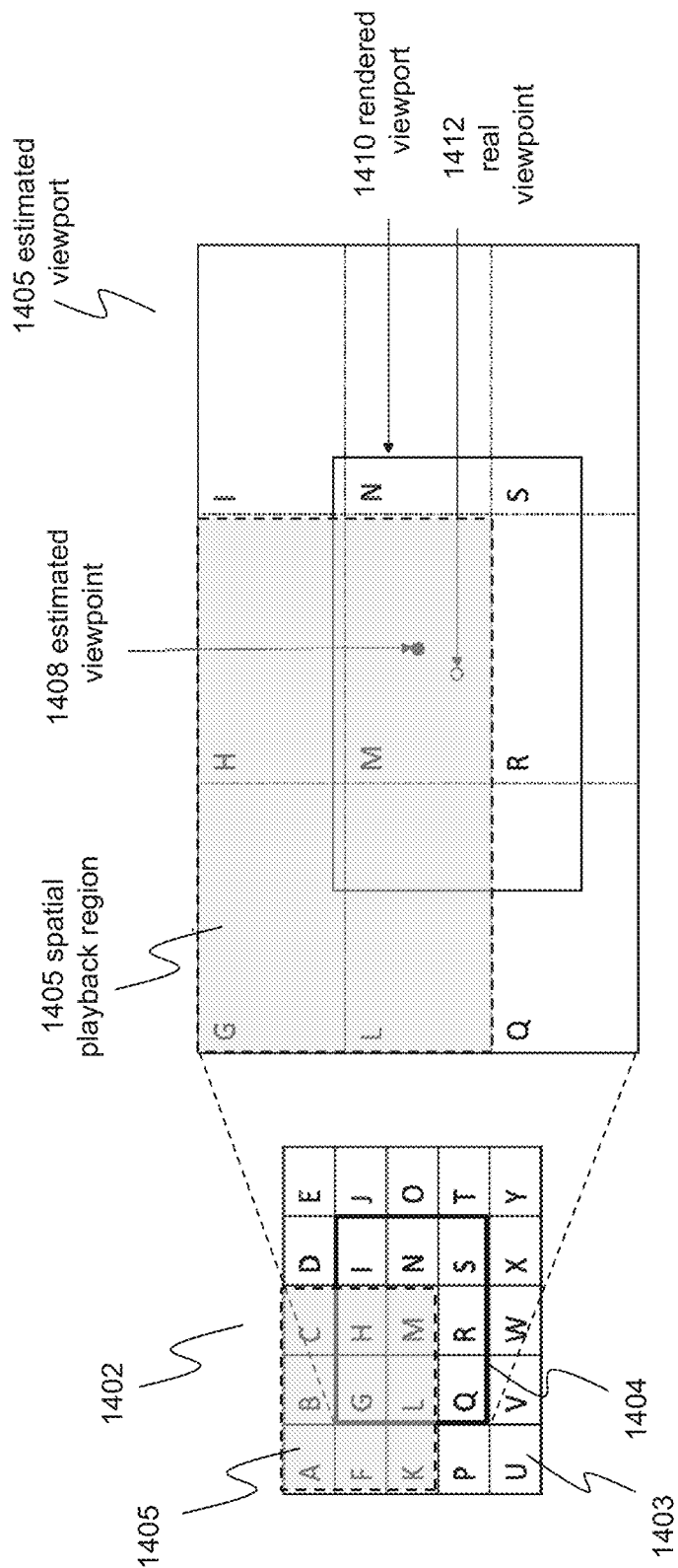
FIGS. 14A and 14B depict the determination of a viewpoint on the basis of requested tile streams according to an embodiment of the invention.

FIGS. 14A and 14B depict the determination of a viewpoint on the basis of requested tile streams according to an embodiment of the invention. FIG. 14A depicts a copy of a video picture 1402 of a source file, which is spatially divided into a plurality of tiles 1403 (in this example 25 tiles). A client device may start requesting tile streams on the basis of a manifest file and sequentially playback tile streams received by the client device. The manifest file comprises metadata may comprise tile stream identifiers, typically URLs, and spatial position information, e.g. one or more spatial relationship descriptors (SRD elements), defining the position of each tile (spatial sub-part as defined by video frames of a tile stream) within the video pictures (a video picture being the reference space in which the position of a spatial subpart is defined).

For example, based on the viewpoint and/or viewport of the user (which may be provided by a video processing device, e.g. an HMD, to the client device), the client device may select a set of tile 1404 that includes the (real) viewport 1410 and request transmission of the selected tile streams. The video frames of the requested tile streams may be processed by the client device and stitched together in order to from a continuous video picture, which may define an estimated viewport 1405, which may be associated with an estimated viewpoint 1408. The client device may then crop the viewport out of the stitched video pictures and render the viewport 1410 as depicted in FIG. 14B. The server receiving the requests may determine that the viewport of the video processing device of the user, e.g. an HMD, is linked to the tiles being requested and may use the metadata associated with the tiles, in particular the spatial position information in the manifest file, to calculate the geometric centre of the continuous area formed by the set of tiles 1406. In an embodiment, the method may include using weighted viewpoint tiles. In this embodiment, tiles or certain tiles may be associated with a weight value. Such embodiment, can be used in the case that a certain tile has more interesting content than surrounding tiles. In an embodiment, the method may include using tiles which may have priority over others. Hence, in this embodiment, if a user is requesting a priority tile the viewpoint is determined as being the center of this tile.

FIG. 15A-15E illustrate the selection of an adaptation set by a server apparatus using a spatial playback region and navigation information according to various embodiments of the invention. The selection may be controlled by navigation information associated with a user interacting with the video on the basis of user interface. This information may include the location (e.g. coordinates or information for determining coordinates) of a region of interest (ROI) selected by the user using a user interface (e.g. a GUI, a gesture-based UI or an optical pointing device). For example, the location information may e.g. include coordinates of a viewpoint of a user determined by sensors of a Head Mounted Display (HMD) worn by the user, coordinates of an eye gaze of a user determined by sensors of an HMD, coordinates of a region of interest generated by a user interacting with a user interface of mobile device (e.g. a touch sensitive screen or a gesture-based interface) or a pointing device. In another embodiment, instead of viewpoint, voice recognition may be used for selection by matching with the label parameter.

In an embodiment, viewpoint information may be obtained using an HMD or an equivalent thereof. In that case, position information of the viewpoint (which may be represented as a point on a sphere) or the viewport (which may be represented as a shaped area on a sphere) may be compared with position information of one or more spatial playback regions in the spherical video (which may be defined as a regions on the sphere). The server apparatus may decide that a playback region is selected if the position of the viewpoint is within a playback region or if the position of the viewport at least partly overlaps with the region. Such a scheme may be implemented by obtaining the coordinates of the user's viewpoint or viewport and determining at which position the viewpoint or viewport is located on the spatial playback (SPR) map.

FIG. 15A illustrates an example of a spatial playback region selection scheme according to an embodiment of the invention. In this particular embodiment, a viewport of the user as determined by the video processing device, e.g. an HMD and the spatial playback regions may be used to select the next adaptation set. One or more sensors of the video processing device may determine the viewport on the basis of the orientation of the head of the user wherein the viewpoint is defined as the center of the viewport. The figure depicts a rectangular spatial playback region (SPR) map, wherein the outer boundaries may coincide with the boundaries of the video frames of the video (e.g. a panorama video or a 360 video). The SPR map may comprise a plurality of spatial playback regions, in this example five spatial playback regions 1-5, of different sizes and shapes. When the video is rendered by a video processing device of a user, only a part of the content of the video frames are rendered. This part may be referred to as the viewport of the user. A user may use the viewport to select an adaptation set that is linked to a particular spatial playback region. For example, in FIG. 15A the position of the viewpoint is located within spatial playback region 1 so that the server apparatus will select the adaptation set that is linked to this region.

FIG. 15B illustrates an example of spatial playback region selection on the basis of eye-gaze detection sensor (which may be implemented in e.g. an HMD). By detecting eye gaze, the viewing direction of the user (the viewpoint) can be determined more accurate. In case of a HMD for example this would mean that the viewpoint is no longer necessarily in the center of the viewport (which is determined on the basis of the orientation of the head of the user, as described with reference to in FIG. 15A). FIG. 15B shows an example of a a spatial playback region map comprising five spatial playback regions (similar to FIG. 15A), wherein the viewport and viewpoint are controlled on the basis of an eye-gaze detection sensor. In the example of FIG. 15B, the position of the viewpoint is located within spatial playback region 2 so that the client device will select the adaptation set that is linked to this region.

FIG. 15C illustrates an example of spatial playback region selection on the basis of a viewport rendered on a 2D screen of a mobile device. For example, the client device may render a region of interest (ROI) of the full scene defined by the video frames of a panorama video, wherein the spatial playback region information may define 5 spatial playback regions in the video frames of the panorama video. A user may interact with the rendered content on the basis of a user interface, e.g. a touch screen or a gesture-based user interface or the like. For example, a user may use panning and zooming actions to select a particular region of interest (ROI) of the scene for display. The center of the content that is rendered on the screen may define a viewpoint or a viewport and may be used by the client device to determine which region is selected. FIG. 15C depicts an example of a spatial playback region map including a viewpoint (black dot) and the region of the map that is rendered on screen (dotted line). The position of the viewpoint is located within spatial playback region 3 so that the client device may select the adaptation set that is linked to this region.

FIG. 15D illustrates an example of spatial playback region selection on the basis of an active finger gesture by user. A user may determine a region of interest in the scene that is displayed to the user using a touch-sensitive screen or a gesture-type user interface. The user may select the region of interest by touching the screen or a predetermined gesture. FIG. 15D depicts an example of a spatial playback region map including the click point (black dot) and the region on the map that is rendered on screen (dotted line). The position of the click point (the point of the screen that was touched by the user) is located within spatial playback region 4 so that the server apparatus may select the adaptation set that is linked to this region.

Figure 15E:
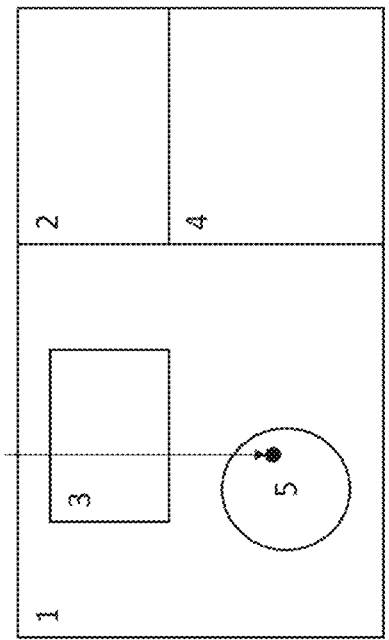

FIG. 15E illustrates an example of spatial playback region selection on the basis of active pointing via input device. In this embodiment, a pointing device may be used to generate a viewpoint signal. For example, displays exists which allow a light source, e.g. laser, as a pointing device. FIG. 13E depicts an example of a spatial playback region map with the remote pointer (black dot). The position of the pointer is located within spatial playback region 5 so that the server apparatus will select the adaptation set that is linked to this region.

While the spatial playback regions and the viewpoints in FIG. 15A-15E are illustrated on the basis of a 2D coordinate system, other coordinates systems e.g. a 3D spherical coordinate system e.g. as described with reference to FIGS. 11 and 12) may also be used. A spherical coordinate system is especially appropriate when describing nonlinear playback of spherical video.

FIG. 15E may also illustrate an example of spatial playback region selection on the basis of a voice command application. In this scenario, each region may be linked a with predetermined voice commands using the "label" parameters as described with reference to table 2. A user would be presented with one or more options (either visually or by audio) and thereafter a user may select an option using a voice-controlled interface. For example, a user may speak his desired choice and the voice-controlled interface will match the user selection with the "label" parameter that is associated with each region. This can help people who are visually impaired and are for example hearing an audio track which presents options.

Figure 16:
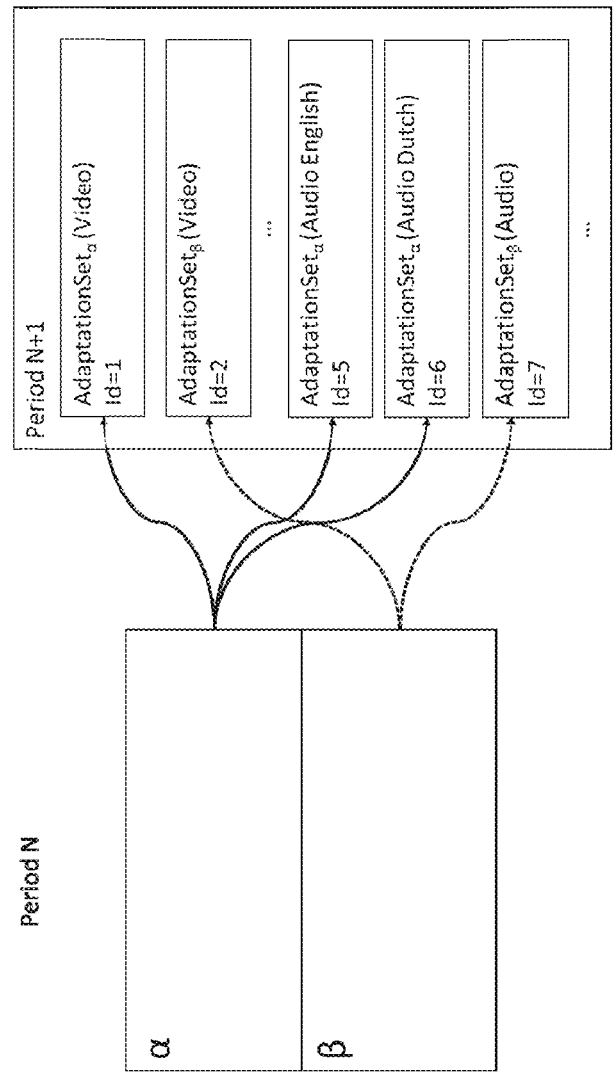
FIG. 16 illustrates a selection of an adaptation set on the basis spatial playback regions according to an embodiment of the invention.

FIG. 16 illustrates a selection by a server apparatus of one or more adaptation sets from a plurality of adaptation sets according to an embodiment of the invention. In particular, FIG. 16 depicts an embodiment wherein the server apparatus having chosen spatial playback region SPRα is allowed to select Adaptation Sets 1, 5 and 6 and the server apparatus having chosen spatial playback region SPR☐ is allowed to select adaptation sets 2 and 6. The spatial playback region selector of the server apparatus may use the spatial playback information in the metadata file that is stored in a database connected to a server and viewpoint information and/or other user input to select the next adaptation set. This subset selection of Adaptation Sets may precede over all other selection criteria, e.g. as defined in the DASH standard. For instance, the language selection may happen only inside the subset of adaptation set.

Figure 17:
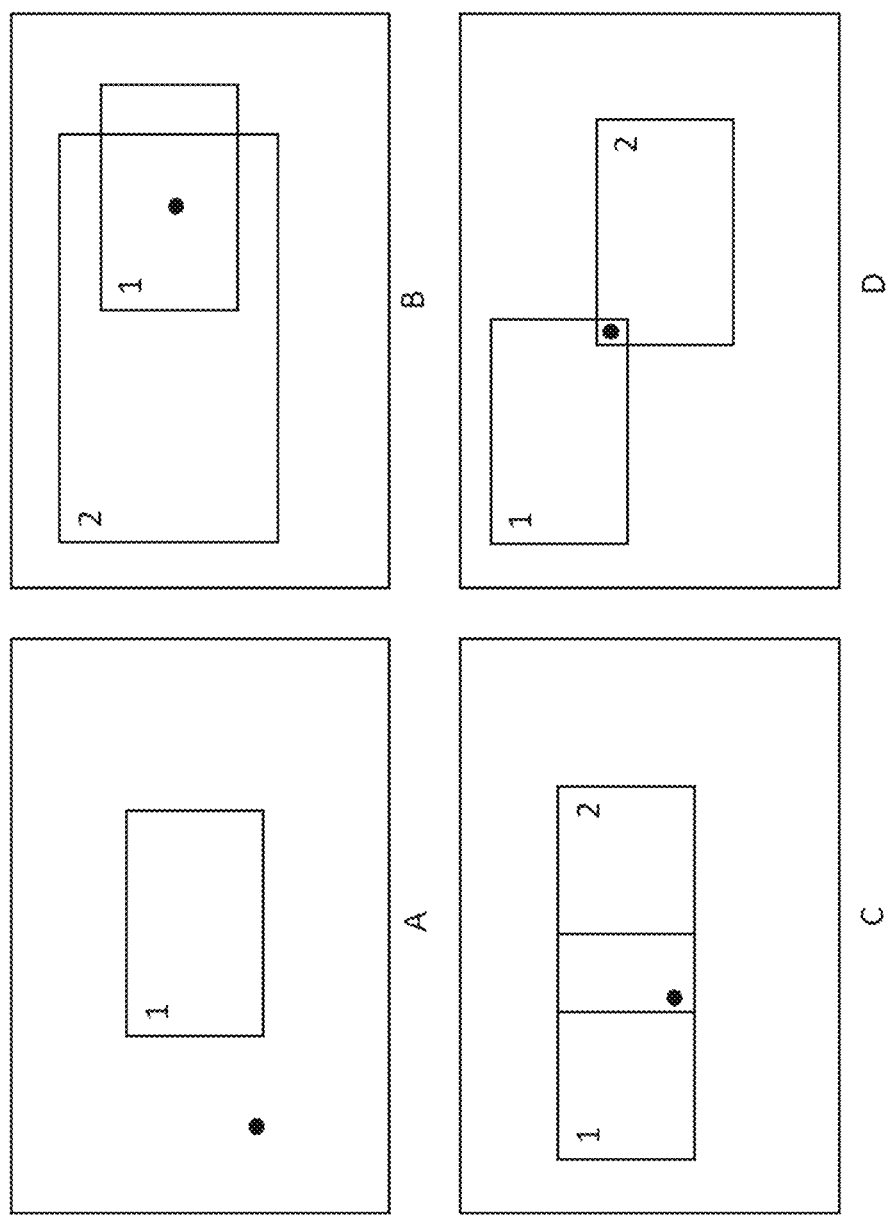
FIG. 17A-17D shows spatial playback region selection scenarios that may arise in the various embodiments described in this application.

FIG. 17A-17D show spatial playback region selection scenarios that may arise in the various embodiments described in this application. If—at the end of the playback of the current adaptation set—a user did not interact with any of the regions (e.g. did not looked at) as defined by the spatial playback region descriptors of a current adaptation set, the selection scheme on the basis of the spatial playback information as described in this disclosure will not be triggered. Such scenario may exist if the video pictures are not entirely partitioned in spatial playback regions. In that case, playback may be continued by the HAS client device as in a conventional HAS playback scenario. The HAS client device may parse the manifest file and select an adaptation set of the playback period according to the order the playback periods are listed in the manifest file and will continue playback without using the spatial playback information (as shown in FIG. 17A).

In the case that one spatial playback region is located within another playback region (or in case there is an overlap) it may be defined the smaller spatial playback region has priority over the larger one (as shown in FIG. 17B). In case, the two playback regions are of the same size, the spatial distance from the viewpoint to the center of the each of the playback regions may be calculated. It may be defined that the playback region that is closest to the viewpoint may be selected (as shown in FIG. 17C). Alternatively, and/or additionally (e.g. if the distance is the same), then the playback region that has the smallest id number may be selected (as shown in FIG. 17D). Hence, as shown in these figures, in case a user interacts with two or more playback regions, selection rules may be defined on the basis of the dimensions of the playback regions, the distance of (the centre of) the spatial playback regions and the viewpoint and/or other criteria, such as the id number of the spatial playback regions.

Figure 18:
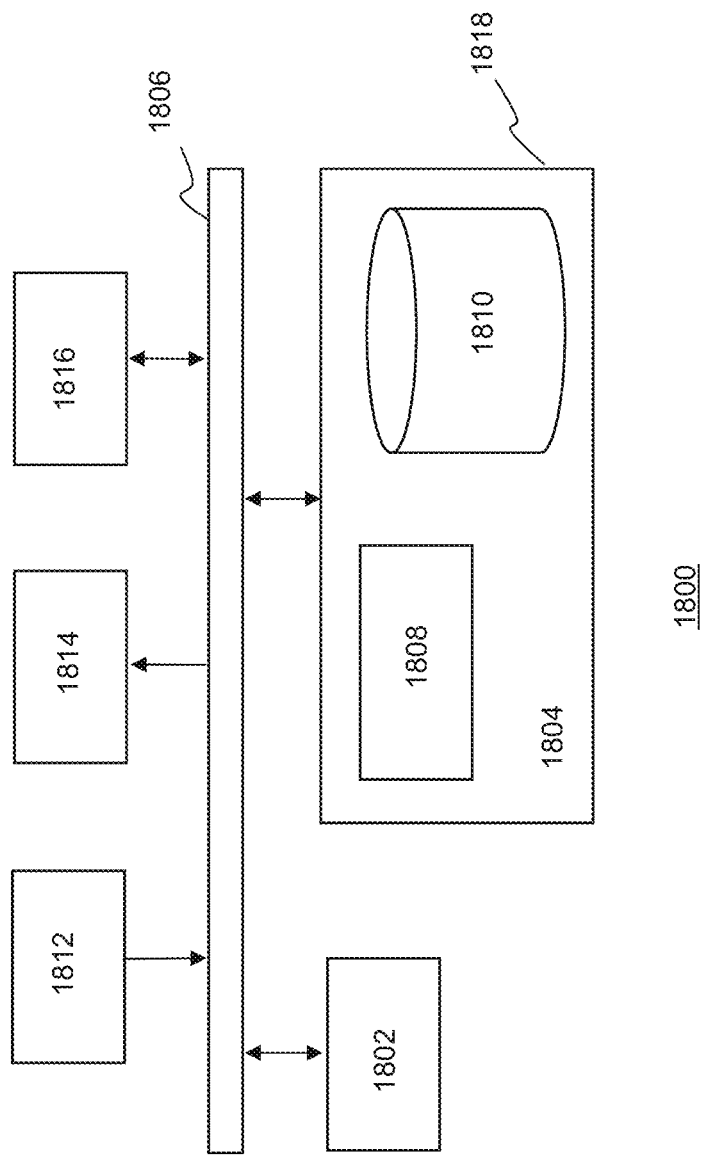
FIG. 18 is a block diagram illustrating an exemplary data computing system that may be used for executing methods and software products described in this disclosure.

FIG. 18 is a block diagram illustrating exemplary data processing systems described in this disclosure. Data processing system 1800 may include at least one processor 1802 coupled to memory elements 1804 through a system bus 1806. As such, the data processing system may store program code within memory elements 1804. Further, processor 1802 may execute the program code accessed from memory elements 1604 via system bus 1806. In one aspect, data processing system may be implemented as a computer that is suitable for storing and/or executing program code. It should be appreciated, however, that data processing system 1800 may be implemented in the form of any system including a processor and memory that is capable of performing the functions described within this specification.

Memory elements 1804 may include one or more physical memory devices such as, for example, local memory 1808 and one or more bulk storage devices 1810. Local memory may refer to random access memory or other non-persistent memory device(s) generally used during actual execution of the program code. A bulk storage device may be implemented as a hard drive or other persistent data storage device. The processing system 1800 may also include one or more cache memories (not shown) that provide temporary storage of at least some program code in order to reduce the number of times program code must be retrieved from bulk storage device 1810 during execution.

Input/output (I/O) devices depicted as input device 1812 and output device 1814 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1816 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1850.

As pictured in FIG. 18, memory elements 1804 may store an application 1818. It should be appreciated that data processing system 1800 may further execute an operating system (not shown) that can facilitate execution of the application. Application, being implemented in the form of executable program code, can be executed by data processing system 1800, e.g., by processor 1802. Responsive to executing application, data processing system may be configured to perform one or more operations to be described herein in further detail.

In one aspect, for example, data processing system 1800 may represent a client data processing system. In that case, application 1818 may represent a client application that, when executed, configures data processing system 1800 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1818, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for adaptive streaming of video data, the method comprising:
a server apparatus transmitting first metadata to a client apparatus, the first metadata defining a first adaptation set, an adaptation set defining one or more sets of segment identifiers, each set of segment identifiers defining a plurality of linearly playable media segments of a predetermined resolution, each media segment in a set of media segments having an identical playback duration, the first metadata enabling a client apparatus to request media segments and sequentially playout the media segments;
the server apparatus receiving navigation information from the client apparatus, the navigation information defining at least a first region in video frames of the first adaptation set;
the server apparatus selecting second metadata defining a second adaptation set on the basis of spatial playback information and a spatial distance or a spatial overlap between the first region and a second region in the video frames of the first adaptation set, wherein the spatial playback information signals the server apparatus that the second region in the video frames of the first adaptation set is linked to media segments of the second adaptation set; and
the server apparatus transmitting the second metadata or information for retrieving the second metadata to the client apparatus, the second metadata enabling the client apparatus to playback media segments of the second adaptation set after the playback of media segments of the first adaptation set.

2. The method according to claim 1 further comprising:
the server apparatus receiving one or more request messages from the client apparatus or receiving information associated with the one or more request messages, the one or more request messages signaling the server apparatus to transmit segments of the first adaptation set to the client apparatus.

3. The method according to claim 2 wherein the navigation information and a client identifier are transmitted in one or more request messages to the server apparatus.

4. The method according to claim 1, wherein the navigation information is transmitted over a separate bi-directional communication channel to the server apparatus.

5. The method according to claim 1, wherein the first metadata defines a set of adaptation sets, each adaptation set defining media segments of a tile stream, wherein video frames of a tile stream define a similar spatial subpart, tile, of a video picture.

6. The method according to claim 5, wherein the server apparatus determines the navigation information on the basis of the tile streams requested by the client apparatus.

7. The method according to claim 1, wherein the segment identifiers defined by the first metadata are associated with a client identifier or information for determining a client identifier.

8. The method according to claim 1, wherein the spatial playback information further includes location information of the first region, the location information including coordinates associated with a location of the first region in one or more video frames of the first adaptation set or information to determine coordinates of the first region in one or more video frames of the first adaptation set.

9. The method according to claim 8 wherein the spatial playback information further includes a dynamic region parameter, the dynamic region parameter signaling the server apparatus that the location of the first region changes as a function of time.

10. The method according to claim 1, wherein the spatial playback information defines a plurality of regions in video frames of the at least one first adaptation set and a plurality of destination identifiers associated with the plurality of regions, each destination identifier signaling the server apparatus that a region associated with a destination identifier is linked to a further adaptation set, the server apparatus selecting the second adaptation set from a plurality of further adaptation sets on the basis of the locations of the regions and the location of the at least a second region.

11. The method according to claim 1, wherein the adaptive streaming is based on an HTTP adaptive streaming protocol, the protocol being one of: MPEG Dynamic Adaptive Streaming over HTTP (MPEG DASH), or 3GPP DASH; and wherein a playback period is defined as a Period as defined in the MPEG DASH standard or a MPEG Common Media Application Format (CMAF) Presentation as defined in the CMAF standard, a Period comprising one or more Adaptation Sets, an Adaptation Set including one or more Representations, a Representation including segments comprising video data of a predetermined video quality and CMAF Presentation comprising one or more CMAF Switching Sets, a CMAF Switching Set including one or more CMAF Tracks, a Track including CMAF fragments comprising video data of a predetermined video quality.

12. The method according to claim 1, wherein the video data include spherical video data, the spherical video data defining pixels on a curved surface, wherein a region of interest is associated with a viewing direction of a user viewing the video playback of the spherical video data, the region of interest and the first region being defined on the basis of a spherical coordinate system.

13. The method according to claim 1, wherein a playback period is defined as a Period as defined in the MPEG DASH standard or a MPEG Common Media Application Format (CMAF) Presentation as defined in the CMAF standard, a Period comprising one or more Adaptation Sets, an Adaptation Set including one or more Representations, a Representation including segments comprising video data of a predetermined video quality and CMAF Presentation comprising one or more CMAF Switching Sets, a CMAF Switching Set including one or more CMAF Tracks, a Track including CMAF fragments comprising video data of a predetermined video quality.

14. A client apparatus comprising:
a computer readable storage medium having computer readable program code embodied therewith, and a processor coupled to the computer readable storage medium, wherein responsive to executing the computer readable program code, the processor is configured to perform executable operations comprising:
receiving metadata from a server apparatus, the metadata defining a first adaptation set, an adaptation set defining one or more sets of segment identifiers, each set of segment identifiers defining a plurality of linearly playable media segments of a predetermined resolution, each media segment in a set of media segments preferably having an identical playback duration, the first metadata enabling the client apparatus to request media segments and to sequentially playout the media segments of the set;

selecting one or more segment identifiers on the basis of the metadata and transmitting one or more requests comprising the one or more segment identifiers and a client identifier to a server apparatus;

transmitting navigation information to the server apparatus, the navigation information defining at least a region in the video frames of the first adaptation set; and receiving second metadata or information for retrieving the second metadata, the second metadata enabling the client apparatus to playback media segments of the second adaptation set after the playback of the first adaptation set.

15. A server apparatus configured to generate metadata for a client apparatus, the metadata being configured to enable streaming of media to the client apparatus, the server apparatus comprising:

a computer readable storage medium having computer readable program code embodied therewith, and a processor coupled to the computer readable storage medium, wherein responsive to executing the computer readable program code, the processor is configured to perform executable operations comprising:

transmitting first metadata to a client apparatus, the first metadata defining a first adaptation set, an adaptation set defining one or more sets of segment identifiers, each set of segment identifiers defining a plurality of linearly playable media segments of a predetermined resolution, each media segment in a set of media, the first metadata enabling a client apparatus to request media segments and sequentially playout the media segments;

receiving navigation information from the client apparatus, the navigation information defining at least a first region in video frames of the first adaptation set;

selecting second metadata defining a second adaptation set on the basis of spatial playback information and a spatial distance or a spatial overlap between the first region and a second region in the video frames of the first adaptation set, wherein the spatial playback information signals the server apparatus that the second region in the video frames of the first adaptation set is linked to media segments of the second adaptation set; and transmitting the second metadata or information for retrieving the second metadata to the client apparatus, the second metadata enabling the client apparatus to playback media segments of the second adaptation set after the playback of media segments of the first adaptation set.

16. A non-transitory computer-readable medium having instructions stored thereon adaptive streaming of video data that, when executed by one or more processors of a server apparatus, cause the server apparatus to carry out operations including:

transmitting first metadata to a client apparatus, the first metadata defining a first adaptation set, an adaptation set defining one or more sets of segment identifiers, each set of segment identifiers defining a plurality of linearly playable media segments of a predetermined resolution, each media segment in a set of media segments having an identical playback duration, the first metadata enabling a client apparatus to request media segments and sequentially playout the media segments;

receiving navigation information from the client apparatus, the navigation information defining at least a first region in video frames of the first adaptation set;

selecting second metadata defining a second adaptation set on the basis of spatial playback information and a spatial distance or a spatial overlap between the first region and a second region in the video frames of the first adaptation set, wherein the spatial playback information signals the server apparatus that the second region in the video frames of the first adaptation set is linked to media segments of the second adaptation set; and transmitting the second metadata or information for retrieving the second metadata to the client apparatus, the second metadata enabling the client apparatus to playback media segments of the second adaptation set after the playback of media segments of the first adaptation set.

* * * * *